(12) United States Patent
Olariu et al.

(10) Patent No.: US 10,943,305 B2
(45) Date of Patent: Mar. 9, 2021

(54) AUTOMONOUS CANCELLATION OF INSURANCE POLICES USING A MULTI-TIERED DATA STRUCTURE

(71) Applicant: Hippo Analytics Inc., Palo Alto, CA (US)

(72) Inventors: Adrian Mihai Olariu, Tg Mures (RO); Arie Yelovitch, Santa Clara, CA (US); Eyal Navon, Sunnyvale, CA (US)

(73) Assignee: Hippo Analytics Inc., Palo Alto, CA (US)

( * ) Notice: Subject to any disclaimer, the term of this patent is extended or adjusted under 35 U.S.C. 154(b) by 0 days.

(21) Appl. No.: 16/450,626

(22) Filed: Jun. 24, 2019

(65) Prior Publication Data
US 2020/0402177 A1   Dec. 24, 2020

(51) Int. Cl.
*G06Q 40/08* (2012.01)
*G06F 16/901* (2019.01)
*G06Q 30/02* (2012.01)

(52) U.S. Cl.
CPC .......... *G06Q 40/08* (2013.01); *G06F 16/901* (2019.01); *G06Q 30/0281* (2013.01)

(58) Field of Classification Search
CPC ........ G06Q 10/00; G06Q 20/00; G06Q 30/00; G06Q 40/00; G06Q 40/08; G06Q 30/0281; G06F 16/901
USPC ....................................................... 705/3–44
See application file for complete search history.

(56) References Cited

U.S. PATENT DOCUMENTS

| | | | | |
|---|---|---|---|---|
| 6,526,386 B1 * | 2/2003 | Chapman | ............... | G06Q 10/10 705/2 |
| 7,860,735 B2 * | 12/2010 | Evanitsky | .............. | G06Q 40/08 705/4 |
| 8,266,031 B2 * | 9/2012 | Norris | ................ | G06Q 30/0224 705/35 |

(Continued)

OTHER PUBLICATIONS

Christian Thimann, "Systematic Features of Insurance and Banking and the Role of Leverage Capital and Loss Absorption", The International Association for the Study of Insurance Economics 1018-5895/15, The Geneva Papers, 2025, 40, (359-384), (Year: 2015).*

*Primary Examiner* — Frantzy Poinvil
(74) *Attorney, Agent, or Firm* — Schwegman Lundberg & Woessner, P.A.

(57) ABSTRACT

A policy issuance architecture processes cancellation requests for cancelling insurance policies maintained by the policy issuance architecture. The policy issuance architecture includes several multi-tiered data structures, wherein each multi-tiered data structure corresponds to a particular geographic region. The policy issuance architecture references a particular multi-tiered data structure based on the geographic region associated with an identified insurance policy. The policy issuance architecture uses the particular multi-tiered data structure to populate various selectable fields used to create a cancellation request for the identified insurance policy. After the values of the selectable fields have been selected and/or entered, the policy issuance architecture verifies the values to ensure that the cancellation request has been properly configured. Upon submission of the cancellation request, the policy issuance architecture associates the cancellation request with the identified insurance policy.

20 Claims, 13 Drawing Sheets

(56) References Cited

U.S. PATENT DOCUMENTS

| | | | | |
|---|---|---|---|---|
| 8,290,797 | B2* | 10/2012 | Hargroder | G06Q 40/08 705/4 |
| 8,566,128 | B2* | 10/2013 | Koziol | G06Q 40/08 705/36 R |
| 9,165,326 | B1* | 10/2015 | He | A61B 5/18 |
| 9,984,415 | B2* | 5/2018 | Keefer | G06Q 40/08 |
| 2003/0028405 | A1* | 2/2003 | Chapman | G06Q 40/08 705/4 |
| 2006/0100889 | A1* | 5/2006 | Gosko | G06Q 30/02 705/26.1 |
| 2007/0185743 | A1* | 8/2007 | Jinks | G06Q 40/08 705/4 |
| 2011/0071858 | A1* | 3/2011 | Keefer | G06Q 40/08 705/4 |
| 2012/0041790 | A1* | 2/2012 | Koziol | G06Q 40/08 705/4 |
| 2012/0303389 | A1* | 11/2012 | Friedman | G06Q 30/02 705/4 |
| 2013/0090950 | A1* | 4/2013 | Rao | G06Q 30/0613 705/4 |
| 2015/0012304 | A1* | 1/2015 | Rao | G06Q 30/0613 705/4 |

* cited by examiner

FIG. 7

AUTOMONOUS CANCELLATION OF INSURANCE POLICES USING A MULTI-TIERED DATA STRUCTURE

TECHNICAL FIELD

The subject matter disclosed herein generally relates to the technical field of database management and design and, in particular, to implementing a database that can be readily populated and queried with minimal impact to computing performance and resources.

BACKGROUND

In implementing an insurance claims processing system, one of the challenges is ensuring that the insurance policies are active and not unduly cancelled. Policyholders depend on an insurance company knowing which insurance policies are active, and determining whether an insurance policy should be cancelled can often be a time consuming process. This process can be time consuming because validating the state of an insurance policy often requires a human insurance agent to review the insurance policy and ensure that the insurance policy not be unnecessarily cancelled.

However, there are instances when an insurance company needs and/or is required to cancel a policy for a customer or policy holder. For example, the insurance company may cancel a policy for lack of payment or if a property being insured fails an inspection. In these instances, it is in the best interest of the insurance company to cancel the insurance policy covering the insured property. However, there are often rules and government-level protections in place that often preclude the insurance company from canceling a policy unless certain conditions are met or until a predetermined time period has elapsed. Because insurance policies are typically governed at the local level (e.g., at the state government level), the rules and/or regulations governing when an insurance policy can be cancelled can vary widely from state-to-state.

BRIEF DESCRIPTION OF THE DRAWINGS

Some embodiments are illustrated by way of example and not limitation in the figures of the accompanying drawings.

FIG. 7 illustrates a display of underwriting timing periods using the graphical user interface of FIG. 3 based on input provided in FIG. 6, according to an example embodiment.

DETAILED DESCRIPTION

Figure 1:
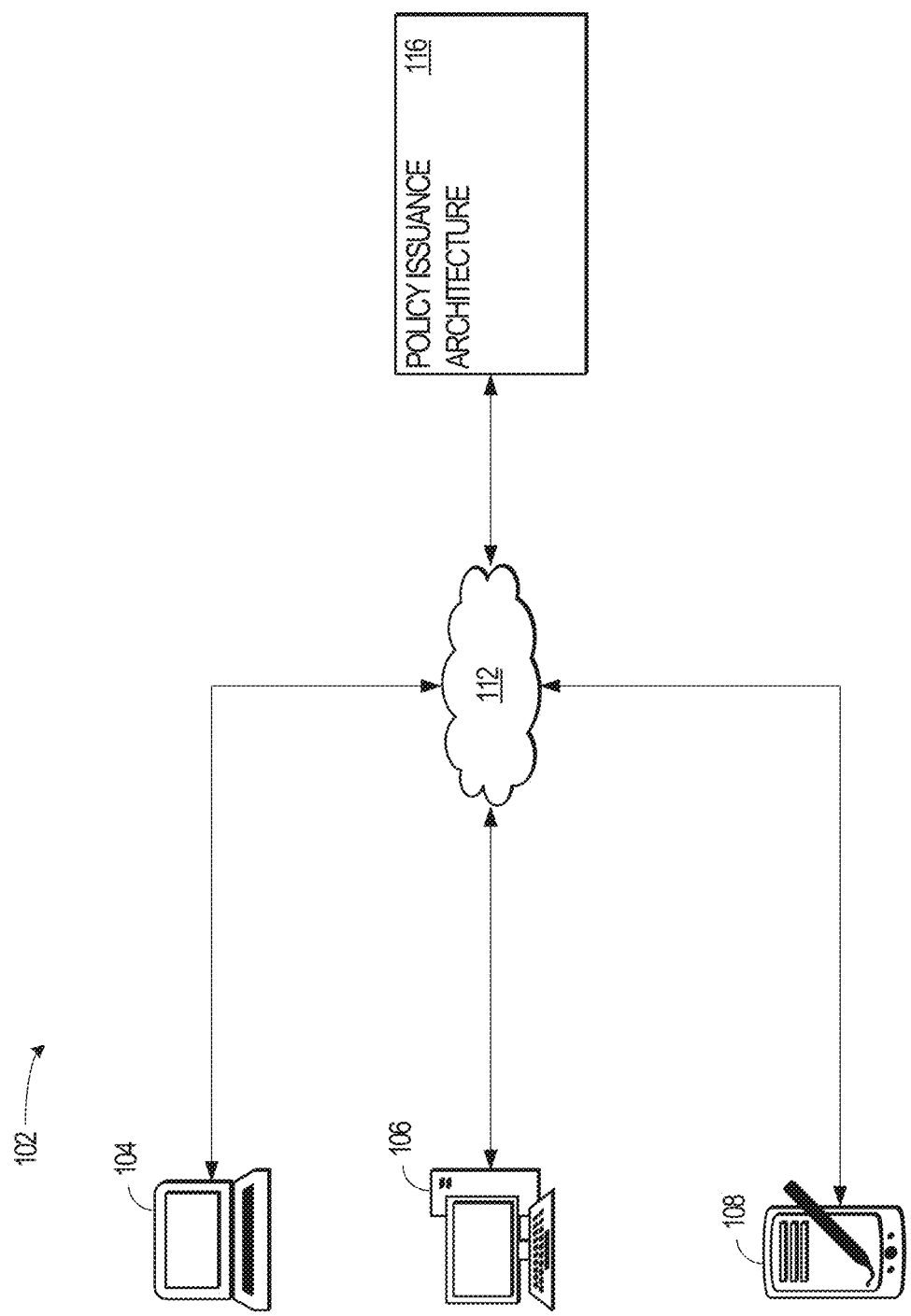
FIG. 1 is a block diagram illustrating a networked architecture, according to some example embodiments, including a policy issuance architecture.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

This disclosure provides for an insurance policy issuance architecture that facilitates the management of an insurance policy and identifying whether an insurance policy should be cancelled. The insurance policy issuance architecture includes various components and applications that allows an end user to access an insurance policy and to establish a rule-based mechanism for when an insurance policy is to be cancelled. In one embodiment, the insurance policy issuance architecture displays various graphical user interfaces that allow the user to establish the timeframe and/or reasons for which an insurance policy is to be cancelled. The graphical user interfaces may include various input fields having pre-populated values that allow the user to select one or more categories that generally relate to the reason for the cancellation of the insurance policy. In addition, the selection of a specific category causes other input fields to become populated with values that relate to the specific reason for the cancellation of the insurance policy.

Furthermore, the graphical user interfaces provide one or more text fields that allow the user to provide a custom reason or explanation for the cancellation of a particular insurance policy. Thus, if the text fields with the pre-populated (or predetermined) values do not include a rationale or reason that sufficiently explains the cancellation of the insurance policy, the user (e.g., an insurance agent) can provide his or her own reason that better explains the rationale for the cancellation of the insurance policy.

In implementing the categories and/or reasons that explain the cancellation of an insurance policy, there can be several hundred individual reasons. Further still, each state and or locale may require one or more reasons unique to the state or locale be provided in the event that an insurance policy is to be cancelled. To implement these reasons, the disclosed policy issuance architecture may implement a multi-tiered data structure where the multi-tiered data structure evaluates one or more of the selected reasons to display one or more sub-panels that further explain the reason for the cancellation. In doing so, the selection of a reason may cause a change in a graphical user interface for interacting with the policy issuance architecture.

In addition, when an insurance policy is designated for cancellation, the policy issuance architecture may reference the multi-tiered data structure to determine if and/or when the insurance policy may be cancelled. In one embodiment, this determination is made at the time a reason for cancelling the insurance policy is selected. Further still, the policy issuance architecture may perform this determination to determine the earliest time when the insurance policy may be cancelled. As noted above, each state and/or locale may have their own laws and/or regulations specifying when an insurance policy may be cancelled (e.g., one or more time limits specifying when an insurance policy may be cancelled), and the multi-tiered data structure ensures that the policy issuance architecture adheres to these laws and/or regulations.

This disclosure now turns to the various disclosed embodiments that implement the technical aspects described herein. With reference to FIG. 1 is a block diagram illustrating a networked architecture 102, according to some example embodiments, including a policy issuance architecture 116. The policy issuance architecture 116 provides server-side functionality via a network 112 (e.g., the Internet or wide area network (WAN)) to one or more client devices 104-108. A client device, such as client device 104, may include different applications and/or modules for interacting with the policy issuance architecture 116. Examples of application that may be instantiated by the client device 104 include a web client, a single-purpose application (e.g., an "app"), a multi-purpose application (e.g., a programmatic client), or combinations thereof. The policy issuance architecture 116 is further communicatively coupled with other client devices 106-108, which may include similar applications and/or programs as the client device 104.

The client devices 104-108 may include various types of devices for accessing and interacting with the policy issuance architecture 116. Examples of such devices include, but are not limited to, a mobile phone, desktop computer, laptop, portable digital assistant (PDA), smart phone, tablet, ultra book, netbook, laptop, multi-processor system, microprocessor-based or programmable consumer electronic, or any other communication device that a user may utilize to access the policy issuance architecture 116. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user that is used to perform various interactions with the policy issuance architecture 116, such as displaying one or more attributes and attributes values associated with a customer's insurance policy, and for entering in information that details one or more reasons for why the customer's insurance policy is being cancelled.

In one embodiment, the policy issuance architecture 116 is a network-based appliance that communicates information to the client devices 104-108, where the information includes one or more graphical user interfaces and accompanying data for interacting with the policy issuance architecture 116. One or more users may be a person, a machine, or other means of interacting with the client devices 104-108. In various embodiments, the user is not part of the network architecture 102, but may interact with the network architecture 102 via the client devices 104-108 or another means. For example, one or more portions of the network 112 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client devices 104-108 may include one or more applications (also referred to as "apps") such as, but not limited to, a web browser, messaging application, electronic mail (email) application, a dedicated insurance policy platform application, and the like. In some embodiments, if the insurance policy application is included in one or more of the client devices 104-108, then this application is configured to locally provide the graphical user interfaces and at least some of the functionalities with the application configured to communicate with the policy issuance architecture 116, on an as needed basis, for data and/or processing capabilities not locally available (e.g., access to a policy holder profile and/or policy information, to authenticate a user, to retrieve and/or display insurance policy documents, etc.). Conversely if the insurance policy platform application is not included in the client devices 104-108, the client devices 104-108 may use its web browser to access the services provided by the policy issuance architecture 116.

The user may interact with the network architecture 102 via the client devices 104-108 or other means. For instance, the user provides input (e.g., a touch screen input, an alphanumeric input, an input using a user interface device, etc.) to the client devices 104-108 and the input is communicated to the policy issuance architecture 116 via the network 112. In this instance, the policy issuance architecture 116, in response to receiving the input from the user, communicates information to the client devices 104-108 via the network 112 to be presented to the user. In this way, the user can interact with the policy issuance architecture 116 using one or more of the client devices 104-108.

Further, while the client-server-based network architecture 102 shown in FIG. 1 employs a client-server architecture, the present subject matter is of course not limited to such an architecture, and could equally well find application in a distributed, or peer-to-peer, architecture system, for example.

The insurance underwriter servers may correspond to insurance underwriters that support the insurance agency that operates the policy issuance architecture 116. In one embodiment, each insurance underwriter contracted with the insurance agency establishes an insurance underwriter server that provides various types of insurance-related information to the policy issuance architecture 116, including information relating to or about the binding restrictions and/or moratoriums. In some instances, the insurance underwriters may issue their own binding restrictions and/or moratoriums, in which case, the policy issuance architecture 116 is configured to obtain such information form these servers. Additionally and/or alternatively, a government agency may prohibit and/or limit access to their own servers, in which case, the policy issuance architecture 116 may leverage the access to the insurance underwriter servers to obtain the binding restrictions and/or moratorium information.

Figure 2:
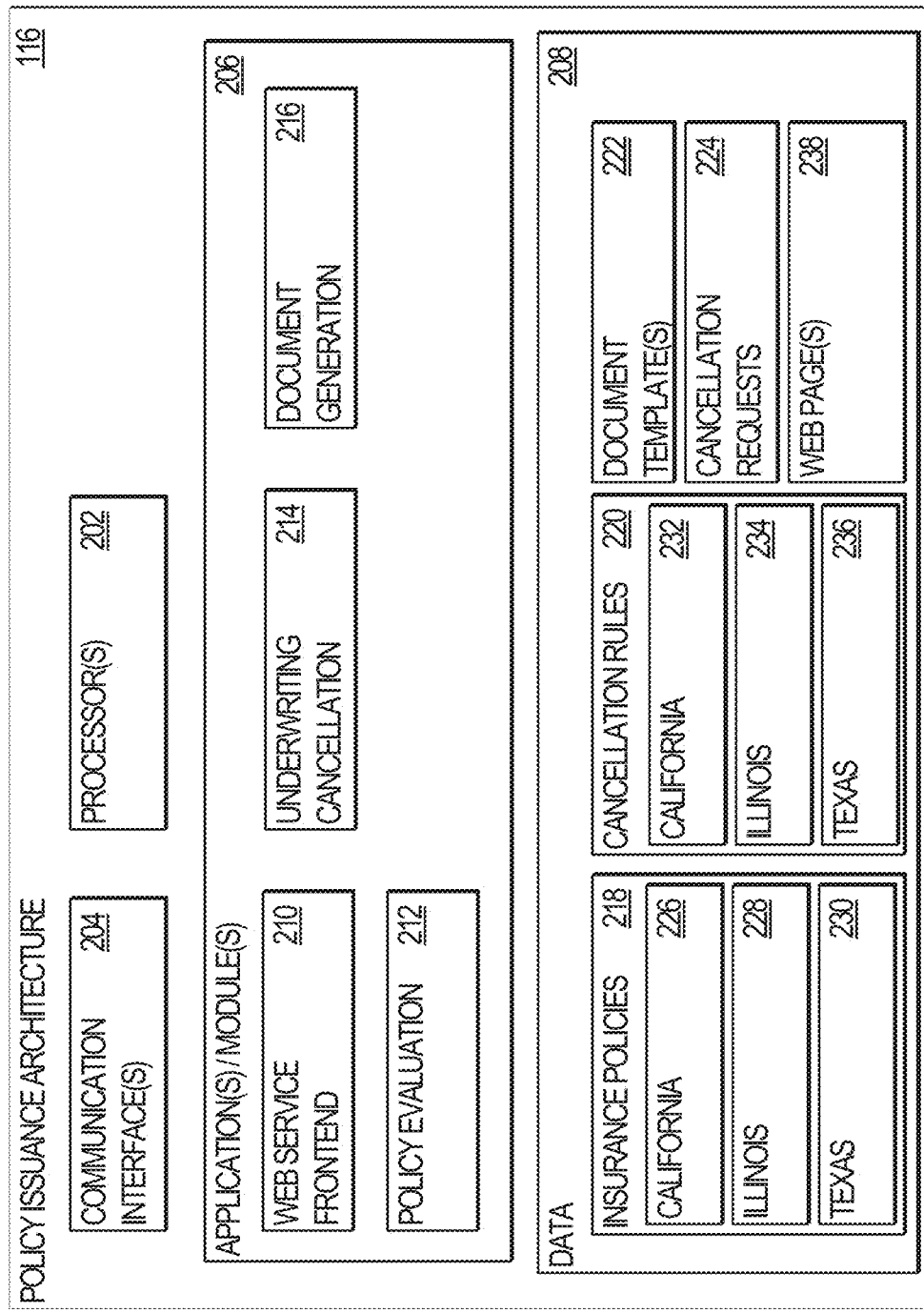
FIG. 2 illustrates various components of the policy issuance architecture of FIG. 1, according to an example embodiment.

FIG. 2 illustrates various components of the policy issuance architecture 116 of FIG. 1, according to an example embodiment. In one embodiment, the policy issuance architecture 116 includes various application(s) and/or modules(s) 206 to facilitate the real-time underwriting cancellation of one or more insurance policies issued by, or maintained by, the policy issuance architecture 116. Although not shown in detail, the policy issuance architecture 116 may also include hardware and/or software components typically implemented in one or more computing devices, such as one or more hardware processors, one or more computer-readable media, one or more communication interfaces, one or more input and/or output devices, and other such components found in a computing device.

The various functional components of the policy issuance architecture 116 may reside on a single device or may be distributed across several computers in various arrangements. The various components of the policy issuance architecture 116 may, furthermore, access one or more databases (e.g., the insurance policies databases 208), and each of the various components of the policy issuance architecture 116 may be in communication with one another. Further, while the components of FIG. 2 are discussed in the singular sense, it will be appreciated that in other embodiments multiple instances of the components may be employed.

The policy issuance architecture 116 may include one or more processor(s) 202 configured to execute one or more computer-executable instructions for instantiating the various application(s)/module(s) 206. The processor(s) 202 of the policy issuance architecture 116 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The processor(s) 202 may also include programmable logic or circuitry that is temporarily configured by software to perform certain operations. Thus, once configured by such software, the processor(s) 202 become specific machines (or specific components of a machine) uniquely tailored to perform the configured functions and are no longer general-purpose processors.

The policy issuance architecture 116 also include one or more communication interface(s) 204 for establishing one or more communication channels with various devices, servers, and equipment. In one embodiment, the policy issuance architecture 116 uses the communication interface(s) 204 to establish communication channels with the client devices 104-108. The communication interface(s) 204 may include one or more wired and/or wireless communication interfaces such as IEEE 802.3, IEEE 802.11, Bluetooth, or any other wired and/or wireless communication interface now known or later developed. The policy issuance architecture 116 may also use the communication interface(s) 204 to facilitate human/machine interactions using one or more input and/or output devices such as a keyboard, mouse, microphone, speakers, displays (touchscreen or otherwise), and other such input and/or output devices. Examples of communication interface(s) 204 used by the policy issuance architecture 116 for input and/or output devices, include, but are not limited to, PS/2, Universal Serial Bus ("USB"), High-Definition Multimedia Interface ("HDMI"), Thunderbolt, or any other communication interface used for human/machine interactions now known or later developed.

Using various machine-readable media, the policy issuance architecture 116 implements the application(s) and/or module(s) 206 and stores the data in databases 208. The machine-readable media may include one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable media" should be taken to include a single medium or multiple media (e.g., a centralized or distributed database, or associated caches and servers) able to store the application(s) and/or module(s) 206 and the data in databases 208. The term "machine-readable media" may also include one or more machine-readable storage devices. Accordingly, the machine-readable medium may be implemented as a single storage apparatus or device, or, alternatively and/or additionally, as "cloud-based" storage systems or storage networks that include multiple storage apparatus or devices.

In one embodiment, the application(s) and/or module(s) 206 are written in a computer-programming and/or scripting language. Examples of such languages include, but are not limited to, C, C++, C#, Java, JavaScript, Perl, Python, or any other computer programming and/or scripting language now known or later developed. In this manner, each of the application(s) and/or module(s) 206 may be implemented in one or more computer-programming and/or scripting language.

With reference to FIG. 2, the application(s) and/or module(s) 206 of the policy issuance architecture 116 are configured to identify which insurance policies held by insurance policy holders are to be cancelled and, in so doing, to periodically determine whether to cancel the identified insurance policies. To perform these and other operations, the application(s) and/or module(s) 206 include, but are not limited to, a web service frontend 210, a policy evaluation module 212, an underwriting cancellation module 214, and a document generation module 216. While the policy issuance architecture 116 may include alternative and/or additional applications and/or modules (e.g., a web-hosting platform, a networking application, a printing application, a software-implemented keyboard, etc.), such alternative and/or or additional applications are not germane to this disclosure and the discussion of such is hereby omitted for brevity and readability.

The data in database 208 referenced and used by the application(s) and/or module(s) 206 include various types of data in support of providing access to the policy issuance architecture 116 and allowing a user to identify whether an insurance policy is to be cancelled. The data in database 208 also supports evaluating whether one or more of the insurance policies maintained by the policy issuance architecture are to be cancelled based on prior interactions with the policy issuance architecture 116.

In this regard, the data in database 208 includes, but is not limited to, one or more insurance policy databases 218, where the insurance policy databases 218 store information relating to one or more insurance policies previously issued to one or more insurance customers. The data in database 208 also includes one or more cancellation rules databases 220, where the cancellation rules databases 220 include specific geographic and/or locale information for determining whether an insurance policy can be cancelled. The data in database 208 also includes one or more document template(s) 222 that can be used by the document generation module 216 to generate electronic documents having information that is specific to an insurance policy stored in one or more of the insurance policy databases 218. Further still, the data in database 208 includes various cancellation requests 224 that have been processed by the policy issuance architecture 116, and one or more webpage(s) 238 that provide access to, and facilitate interactions with, the policy issuance architecture 116 via the web service frontend 210.

The web service frontend 210 is configured to provide one or more of the webpage(s) 238 for interacting with the policy issuance architecture 116. As shown in FIGS. 3-7, the webpage(s) 238 provide graphical user interfaces for interacting with the policy issuance architecture 116. In addition, each of the webpage(s) 238 are dynamic and configured to change according to one or more selections made by a user in identifying an insurance policy to cancel. More specifically, the one or more webpage(s) 238 are configured to reference a multi-tiered data structure to provide menu selections specific to a geographic location and/or locale. For example, the one or more webpage(s) 238 may reference one or more of the cancellation rules databases 220 in determining which of the menu items to manipulate and/or change in response to a user selection. Unlike prior policy issuance architectures, the multi-tiered data structure allows the policy issuance architecture 116 to maintain a complex system of rules and regulations that would normally require a human or manual review to perform.

The underwriting cancellation module 214 is configured to receive a cancellation request of an insurance policy by a user interacting with the policy issuance architecture 116. In one embodiment, the policy issuance architecture 116 communicates one or more of the webpage(s) 238 to a client device for requesting the cancellation of the insurance policy. In this regard, the underwriting cancellation module 214 may be configured to manipulate the webpage(s) 238 provided by the web service frontend 210 and to access one or more of the insurance policy databases 218 and/or cancellation rules databases 220.

In one embodiment, the underwriting cancellation module 214 leverages the one or more insurance policy databases 218 and/or cancellation rules 220 to edit the data and information displayed by the one or more webpage(s) 238. For example, when a user accesses the policy issuance architecture 116 via the web service frontend 210, the user may be requested to provide insurance identifying information that identifies a particular insurance policy. In turn, the underwriting cancellation module 214 accepts this insurance identifying information and queries the insurance policies databases 218 to obtain the insurance policy that corresponds to the insurance identifying information. For example, the insurance identifying information may be a policy number that identifies a particular insurance policy. As another example, the insurance identifying information may be the name of a person or the name of an organization associated with the particular insurance policy. In this manner, the underwriting cancellation 214 is configured to retrieve insurance policy information for a particular insurance policy.

The insurance policies databases 218 may include various state databases 226-230 for the stored insurance policies. Accordingly, there may be a first state database 226 corresponding to insurance policies for covered property (e.g., homes, commercial real estate, automobiles, two-wheeled vehicles, etc.) in California, a second state database 228 corresponding to insurance policies for covered property in Illinois, and a third state database 230 corresponding to insurance policies for covered property located in Texas. Although three state databases 226-230 are illustrated in FIG. 2, the insurance policies databases 218 may include additional or alternative databases depending on where the covered property is located or the insurance policy is registered.

The insurance policies databases 218 may be implemented using one or more database implementations. Examples of database implementations include, but are not limited to, a hierarchical database, a relational database, an object-oriented database, one or more flat files, or combinations thereof. In one embodiment, the insurance policies databases 218 are implemented as two-dimensional tables, where each geographical region and/or locale corresponds to a particular two-dimensional table. In this implementation, rows of the two-dimensional table correspond to insurance policies and the columns of the two-dimensional table correspond to insurance policy attributes such as Carrier Name, Policy Number, Phone Number, Address, Policy Type, Status, Effective Date, and Premium.

Each of the foregoing attributes relate to a different characteristic of the insurance policy. The Carrier Name attribute identifies a company that provides the insurance coverage for the insurance policy, the Policy Number attribute identifies the policy number of the insurance policy, the Phone Number attribute identifies a phone number for a person or company, the Address attribute identifies an address of the property covered by the insurance policy, the Policy Type attribute identifies the type of insurance policy (e.g., condominium insurance, homeowner insurance, renter's insurance, etc.), the Status attribute identifies the status of the insurance policy (e.g., active, cancelled, pending, etc.), the Effective Date attribute identifies the date when the insurance policy became effective, and the Premium attribute indicates a premium amount that the covered person or company pays to maintain the insurance policy. The foregoing list of insurance policy attributes are not exhaustive, and one of ordinary skill in the art will appreciate that alternative insurance policy attributes may also be implemented.

In another implementation, one or more of the insurance policy databases 218 are implemented as a multi-tiered data structure, where variables within the multi-tiered data structure correspond to insurance policy attributes and the variable values correspond to the insurance policy attribute values. For example, one or more of the insurance policy databases 218 may be implemented using JavaScript Object Notation (JSON), where a JSON file represents one or more of the insurance policy databases 218. For example, a first JSON file may include one or more of the insurance policies for the California insurance policy database 226, a second JSON file may include one or more of the insurance policies for the Illinois insurance policy database 228, and a third JSON file may include one or more of the insurance policies for the Texas insurance policy database 230.

Although the foregoing paragraph describes that a JSON file may correspond to a particular state, one of ordinary skill in the art will appreciate that there may be different levels of geographic granularity of the JSON files that define the various insurance policies. For example, the insurance policy databases 218 may include JSON files that represent particular localities or geographic regions, such as where a JSON file corresponds to a ZIP code. Thus, there may be corresponding JSON files for the ZIP codes of California, corresponding JSON files for the ZIP codes of Illinois, and JSON files for the ZIP codes of Texas. In this manner, where the policy issuance architecture 116 implements the insurance policy databases 218 as JSON files, the underwriting cancellation module 214 queries one or more of the JSON files according to the provided insurance identifying information and retrieves the insurance policy attribute values for an insurance policy that matches the provided insurance identifying information.

After identifying a particular insurance policy from the insurance policies database 218, the underwriting cancellation module 214 then modifies a webpage of the webpage(s) 238 to display the insurance policy information associated with the identified insurance policy. In one embodiment, the underwriting cancellation module 214 modifies a portion of a webpage to display the insurance policy information, when is then provided by the web service frontend 210 to one or more of the client devices 104-108.

In addition to retrieving an identified insurance policy from one or more of the insurance policies databases 218, the underwriting cancellation module 214 also identifies and selects one or more cancellation rules from the cancellation rules databases 220 that will be used in cancelling the identified insurance policy. In one embodiment, the cancellation rules database 220 includes one or more rules that determine whether a retrieved insurance policy can be cancelled. For example, one or more of the cancellation rules 220 may specify the time period that an insurance policy can be cancelled. In addition, the cancellation rules 220 may further provide attributes and/or attribute values that are to be displayed in response to input provided by an operator or user of the policy issuance architecture 116. For example, as discussed with reference to FIGS. 3-7, input provided by the user or operator of the policy issuance architecture 116 may cause specific menu items to be displayed or may cause the underwriting cancellation module 214 to modify a displayed webpage to display additional sub-panels for further input.

The cancellation rules databases 220 may be implemented using one or more database implementation technologies. Examples of such database implementation technologies include, but are not limited to, a hierarchical database, a relational database, an object-oriented database, one or more flat files, or combinations thereof. In one embodiment, the cancellation rules databases 220 are implemented as two-dimensional tables, where each geographical region and/or locale corresponds to a particular two-dimensional table. In this implementation, rows of the two-dimensional table correspond to a particular cancellation rule and the columns of the two-dimensional table correspond to cancellation rule attributes.

In another implementation, one or more of the cancellation rules databases 220 are implemented as a multi-tiered data structure, where variables within the multi-tiered data structure correspond to cancellation rule attributes and the variable values correspond to the cancellation rule attribute values. For example, one or more of the cancellation rule databases 220 may be implemented using JavaScript Object Notation (JSON), where a JSON file represents one or more of the cancellation rule databases 218. For example, a first JSON file may include one or more of the insurance policies for the California cancellation rule database 232, a second JSON file may include one or more of the insurance policies for the Illinois cancellation database 234, and a third JSON file may include one or more of the insurance policies for the Texas cancellation rule database 236.

Although the foregoing paragraph describes that a JSON file may correspond to a particular state, one of ordinary skill in the art will appreciate that there may be different levels of geographic granularity of the JSON files that define the various cancellation rules. For example, the cancellation rules databases 220 may include JSON files that represent particular localities or geographic regions, such as where a JSON file corresponds to a ZIP code. Thus, there may be corresponding JSON files for the ZIP codes of California, corresponding JSON files for the ZIP codes of Illinois, and JSON files for the ZIP codes of Texas. In this manner, where the policy issuance architecture 116 implements the cancellation rules databases 220 as JSON files, the underwriting cancellation module 214 queries one or more of the JSON files according to the insurance identifying information provided by the user or operator of the policy issuance architecture 116 to locate the correct JSON file (e.g., the JSON file of the cancellation rules that corresponds to the provided insurance identifying information), and then performs one or more operations on additional input provided by the user or operator using the identified cancellation rules. In this context, the operations may include retrieving one or more values based on the provided input, executing one or more equations on based on the provided input, manipulating or modifying one or more of the displayed webpage(s) 238, or combinations of such operations.

In implementing the cancellation rules databases as one or more JSON files, the policy issuance architecture 116 may employ a multi-level or multi-tiered data structure to accommodate the various categories and/or reasons for why a particular insurance policy may be cancelled. The use of such multi-level or multi-tiered data structure represents a technical improvement over prior implementations because the lookups and evaluations are performed much more rapidly. In prior implementations, an insurance agent or other operator had to review physical files or separate systems to determine whether a particular insurance policy could be cancelled. These procedures were typically quite cumbersome and often involved a non-trivial amount of time on behalf of the insurance agent or operator of an policy issuance architecture. With the implementation described herein, the determination of whether an insurance policy should be cancelled is performed within seconds, and the cancellation of such policy is handled autonomously. Automating the insurance policy cancellation procedure and reducing the amount of time such procedure requires are both technical advancements within the field of computerized systems.

In one embodiment, a JSON file for a cancellation rule is multi-level, and includes various values that may be evaluated by the underwriting cancellation module 214 and/or displayed by one or more of the webpage(s) 238. One example of such a JSON file is reproduced below:

```
{
  new_business: {
    name: 'New-Business',
    underwriting_days: 60,
    excluded_reasons: [ ],
    reasons: {
      new_business_escrow_payment_never_received: {
        code: 98,
        name: 'Escrow Payment Never Received',
        flat: true,
        sub--reasons: {
          new_business_non_payment_of_initial_premium_1: {name:
            'Policy premium was never paid'}
        }
      },
      new_business_insured_request_flat: {
        code: 99,
        name: 'Insured Request',
        flat: true,
        sub-reasons: {
          new_business_insured_request_flat_1: {name: 'Insured stayed
            with prior carrier'},
```

```
            new_business_insured_request_flat_2: {name: 'Insured chose a
          different carrier'},
            new_business_insured_request_flat_3: {name: 'Policy has been
          re-written with a new effective date'},
            new_business_insured_request_flat_4: {name: 'Insured decided
          not to purchase'},
            new_business_insured_request_flat_5: {name: 'Insured no
          longer has insurable interest in the home},
            new_business_insured_request_flat_6: {name: 'Free form text',
          free_form_text: true}
          }
        },
        new_business_company_fequest_flat: {
          code: 100,
            name: 'Company Request',
            flat: true,
            sub-reasons: {
              new_business_company_request_flat_1: {name: 'Free form text',
          free_form_text: true}
            }
          }
        }
    },
    mid_term: {
      name: 'Mid-Term',
      excluded_reasons: [ ],
      reasons: {
        mid_term_insured_request_flat: {
          code: 99,
          name: 'Insured Request',
          flat: true,
          sub-reasons: {
            mid_term insured_request_flat_1: {name: 'Insured stayed with
          prior carrier'},
            mid_term_insured_request_flat 2: {name: 'Insured chose a
          different carrier'},
            mid_term_insured_request_flat_3: {name: 'Policy has been re-
          written with a new effective date'},
            mid_term_insured_request_flat_4: {name: 'Insured decided
          not to purchase'},
            mid_term_insured_request_flat_5: {name: 'Insured no longer has
          insurable interest in the home'},
            mid_term_insured_request_flat_6: {name: 'Free form text',
          free_form_text: true}
          }
        }
      }
    }
}
```

In the foregoing example, the multi-tiered data structure includes three levels. However, in other implementations, the multi-tiered data structure may include alternative levels.

In one embodiment, the first level of the multi-tiered data structure represents the categories of cancellations to which a requested cancellation can belong. This first level may be considered the topmost level of the multi-tiered data structure. Examples of cancellation categories include a "New Business" category for a recently issued insurance policy (e.g., an insurance policy issued within a threshold period of time) that is being cancelled and a "Mid Term" category, where the insurance policy has been issued for a predetermined period of time. Each of the categories at the first level within the multi-tiered data structure corresponds to a "key," which in the art of database management is an identifier used to identify a particular object or entry within the database. In some instances, the key is unique such that each key in a given database is unique. In the implementation provided above, a name of the key (e.g., "new_business") at the first level identifies the cancellation category that corresponds to the key. Using the foregoing implementation, the value of the key is a JSON object that defines the category represented by the key, where the JSON object includes various variables having corresponding variable values and/or further JSON objects.

One of the variables of the first level JSON object is named "underwriting_days," where the value of "underwriting_days" comprises a time period (e.g., a number of days) where the cancellation of the insurance policy can be exercised after the effective date of the insurance policy or before the expiration of the insurance policy. Another variable is named "name," which has a variable value comprising one or more alphanumeric characters, where the string represents a name of the selected category. The name value may be displayed to insurance agents via one or more of the webpage(s) 238 and written into one or more electronic documents that are automatically generated by the policy issuance architecture 116. Finally, the third variable within the "new_business" JSON object is the "reasons" variable, where the value of the "reasons" variable is another JSON object (e.g., a second JSON object).

Like the "new_business" JSON object, the "reasons" JSON object includes one or more variables whose values define the "reasons" JSON object. In addition, because the "reasons" JSON object is nested within the "new_business" JSON object, the "reasons" JSON object is considered a second level (or level two) JSON object.

Furthermore, the "reasons" JSON object includes one or more JSON objects that correspond to reasons for requesting the cancellation of an insurance policy. Accordingly, and in one embodiment, each reason defined within the "reasons" JSON object may be yet another JSON object. Thus, the individual reasons for requesting the cancellation of the insurance policy may each be considered a third level (or level three) JSON object. Each third level JSON object may include one or more variables that define the particular reason represented by the third level JSON object. These variables include, but are not limited to, a "code" variable, a "name" variable, a "flat" variable, and a "sub-reasons" variable. In one embodiment, each category (e.g., a first level JSON object) defined by the multi-tiered data structure includes a "reasons" JSON object. Thus, other JSON objects at the first level, such as the "mid-term" JSON object, may also have a "reasons" JSON object having the same variables as the "reasons" JSON object defined within the "new_business" JSON object. In other embodiments, a first level JSON object may have a "reasons" JSON object having additional, fewer, and/or alternative third level JSON objects.

In one embodiment, the underwriting cancellation module 214 determines whether a given category (e.g., a first level JSON object) has a "reasons" JSON object. Where the underwriting cancellation module 214 determines that a given category does not have a "reasons" JSON object, the underwriting cancellation module 214 may not load and/or modify one or more webpage(s) 238 with the category of reasons corresponding to the first level JSON object having the missing "reasons" JSON object. Alternatively, where the underwriting cancellation module 214 determines that the category has a "reasons" JSON object, the underwriting cancellation module 214 may then load and/or modify one or more of the webpage(s) 238 with the particular category. In some instances, the underwriting cancellation module 214 may ignore a first level JSON object that is missing, or has not defined, a "reasons" JSON object. Thus, in these instances, the underwriting cancellation module 214 may load the one or more webpage(s) 238 with the values of the JSON objects according to the one or more cancellation rules 220, but the underwriting cancellation module 214 may ignore those first level JSON objects that are improperly defined (e.g., missing the "reasons" JSON object).

In one embodiment, each third level JSON object within the "reasons" JSON object corresponds to a reason for the cancellation request 224. The "code" variable (e.g., an attribute of a third level JSON object) has a value that may be referenced by the policy issuance architecture 116 and/or insurance agents that are working with the policy issuance architecture 116.

The "name" variable has a value that is displayed via one or more of the client devices 104-108 and may be inserted into one or more electronic documents generated by the policy issuance architecture 116. Furthermore, and as discussed below with reference to FIGS. 4-5, the value of the "name" variable may be selectable by a user for providing the reason of the cancellation request 224. The value of the "name" variable may be a sequence (or string) of alphanumeric characters in a predetermined spoken language (e.g., English, Spanish, Russian, etc.). The "flat" variable has a value that indicates whether the cancellation being entered for the insurance policy is a flat cancellation. The value of the "flat" variable may comprise a Boolean value that indicates whether the value is "true" or "false."

The "free_form_text" variable has a value that indicates whether a selected reason is enterable as a free-form text reason. In one embodiment, the value is a Boolean value such as "true" or "false." In some implementations, the third level JSON objects that are defined within the "reasons" JSON object have a "name" value that is predetermined and selectable via one or more of the webpage(s) 238. However, in some instances, one or more of the predetermined reasons may not be sufficient for the insurance agent or user interacting with the policy issuance architecture 116. Accordingly, the "free_form_text" variable informs the underwriting cancellation module 214 whether to include a text field within the one or more webpage(s) 238 that allows the insurance agent or user to provide his or her own reason for requesting cancellation of the selected insurance policy. In this manner, when the "reasons" JSON object is loaded by the underwriting cancellation module 214, the underwriting cancellation module 214 populates one or more of the webpage(s) 238 with the predetermined reasons from the "reasons" JSON object (where applicable) and the underwriting cancellation module 214 instantiates one or more of the webpage(s) 238 with a user input text field for providing the user-enterable reason.

The first level JSON object may also include a "sub-reasons" key under the "reasons" JSON object, which, like the "reasons" JSON object, is also a JSON object having one or more variables and assigned variable values. The "sub-reasons" JSON object further defines additional reasons for explaining why the insurance policy should be cancelled. In one embodiment, the "sub-reasons" JSON object includes one or more variables, where each variable is instantiated as a JSON object having a single variable named "name," where the value of the "name" variable of that corresponds to a reason for why the insurance policy is being cancelled. Furthermore, a variable selected from the "sub-reasons" JSON object may include the "free_form_text" variable indicating whether the variable provides a free form text field that allows a user of the policy issuance architecture 116 to provide his or her own reason for cancelling the insurance policy.

In the foregoing example, one or more of the third level JSON objects (e.g., each individual reason implemented as a JSON object) includes a "sub-reasons" JSON object with one or more variables having values of alphanumeric characters corresponding to a reason further explaining the cancellation request 224. For example, the "new_business_escrow_payment_never_received" JSON object has a "sub-reasons" JSON object, where one of the variables is named "new_business_non_payment_of_initial_premimum_1" and has a value of "Policy premium was never paid." As another example, the "mid_term_insured_request_flat" is a third level JSON object having a "sub-reasons" JSON object, where one of the variables of the "sub-reasons" JSON object is named "mid_term_insured_request_flat_1" and has a value of name: 'Insured stayed with prior carrier'), In addition to the foregoing variables and objects, one or more of the cancellation rules 220 may implement a cancellation threshold variable that defines a number of days of notice that an entity, such as the underwriter or insurance agent, is required to provide the customer of the insurance policy prior to cancelling the insurance policy. This cancellation threshold variable may be referenced by the underwriting cancellation module 214 and/or by one or more of the web page(s) 238. In one embodiment, the cancellation threshold variable is referenced to ensure that a user or operator interacting with the policy issuance architecture 116 has selected a cancellation date that conforms to the number of days identified in the cancellation threshold variable. The value of the cancellation threshold variable may vary depending on the geographic location associated with the identified insurance policy and/or the cancellation rules 220 (e.g., there may be a different value for the cancellation threshold variable for the California cancellation rules 232, the Illinois cancellation rules 234, and the Texas cancellation rules 236). In one embodiment, the cancellation threshold variable is implemented as a cancellation conditional statement, which is executed by the underwriting cancellation module 214 in determining whether an identified insurance policy can be cancelled.

Using the multi-tiered data structure described above, the policy issuance architecture 116 is able to rapidly execute underwriting cancellation orders on an as-needed basis depending on the geographic location associated with the selected insurance policy. Unlike prior systems, which often required an agent to use a relational database, a legacy database, or manually access a physical copy of the cancellation rules for a particular geographic location, the disclosed JSON objects and multi-tiered data structure improves the speed at which a cancellation request can be performed for an identified insurance policy.

Furthermore, latency times with the policy issuance architecture 116 may be significantly reduced when the cancellation rules 220 are implemented as JSON files. Because the JSON files are primarily text files, a JSON file (or portions thereof), can be communicated to one or more of the client devices 104-108 and loaded by a web browser in conjunction with one or more of the web page(s) 238. Additionally, and/or alternatively, one or more of the web page(s) 238 may be modified to include one or more of the JSON objects from the cancellation rules 220 based on the JSON file associated with the selected cancellation rule. The policy issuance architecture 116 may then communicate one or more of the webpage(s) 238 for loading by a web browser being executed by one or more of the client devices 104-108. Thus, the cancellation rules 220 may be implemented as client-side rules rather than server-side rules, which reduces the amount of latency normally experienced when rules are executed by a server, and a client device is waiting for a response from the server.

When a cancellation request is successfully processed by the policy issuance architecture 116, various actions occur in response. In one embodiment, the underwriting cancellation module 214 stores one or more selected input values as a cancellation request 224. The values may include one or more of the reasons selected from one or more of the JSON objects, whether the cancellation is a flat cancellation (e.g., the value of a variable corresponding to an indication of whether the cancellation is a flat cancellation), any free form text that a user may have input via the web service frontend 210, one or more dates that specify when the identified insurance policy is to be cancelled, and other such values that may be input by the user via the web service frontend 210. Additional and/or alternative values are illustrated that may be input by the user are illustrated in the graphical user interfaces of FIGS. 3-5. The underwriting cancellation module 214 then associates the cancellation request with the identified insurance policy. The cancellation request 224 may also include an identifier that associates the cancellation request 224 with the identified insurance policy.

When the underwriting cancellation module 214 associates the cancellation request 224 with the identified insurance policy, the underwriting cancellation module 214 may add a "flag" or other value to the insurance policy indicating that the insurance policy is to be cancelled. In one embodiment, the underwriting cancellation module 214 assigns a value to a variable associated with the identified insurance policy that indicates that the insurance policy is to be cancelled. The underwriting cancellation module 214 adds the flag to the insurance policy because, in some instances, the insurance policy is not to be cancelled the day the cancellation request is received but, rather, at a later date. Thus, the flag serves as a notifier to the policy issuance architecture 116 that a particular insurance policy is to be cancelled.

In addition to flagging an insurance policy for cancellation, and storing one or more values of the cancellation request, the policy insurance architecture 116 may execute the document generation module 216. To provide proof and notification of the cancellation, the policy issuance architecture 116 issues one or more documents to the customer or policyholder associated with the insurance policy that is being cancelled. These documents may inform the customer or policyholder about the cancellation, such as the reason for the cancellation, the insurance policy being cancelled, and/or the effective date of the cancellation. In one embodiment, the document generation module 216 is configured to generate one or more electronic documents for an identified insurance policy based on a corresponding document template selected from the document template(s) 222.

The document template(s) 222 may comprise one or more sections of text, but may also include blank text fields that correspond to one or more variables of a cancellation request 224 and/or a JSON object stored in a cancellation rules database 220. One of the challenges of servicing insurance policies associated with different states (e.g., different geographic locations) is that each state may have different rules and/or regulations regarding the notices and/or the language that a document should use in notifying a customer or policyholder about a cancellation. Accordingly, to accommodate these different rules and/or regulations, the policy issuance architecture 116 includes one or more document template(s) 222 that conform to a particular state's requirements. Thus, there may be document template(s) 222 associated with a first state (e.g., California), document template(s) 222 associated with a second state (e.g., Illinois), document template(s) 222 associated with a third state (e.g., Texas), and so forth. These document template(s) 224 may be referenced by an identifier or other value that associates the document template 224 with the particular geographic location. Having the document template(s) 222 allows the policy issuance architecture 116 to adapt to any number of rules and/or regulations that may be required for a particular geographic location.

To generate a document from one or more of the document template(s) 222, the document generation module 216 references one or more of the variable values of the identified insurance policy, one or more variable values of the cancellation request 224 associated with the identified insurance policy, and/or one or more of the variable values of a JSON object defined by one or more of the cancellation rules 220. The document generation module 216 then populates one or more of the fields of the document with the values from the identified insurance policy, one or more of the variables values of the cancellation request 224, and/or the one or more of the variable values of the JSON object (e.g., the JSON object defined by one or more of the cancellation rules 220). The generated electronic document may be in a format readable by a computer application, such as PDF, DOCX, TXT, WPS, or other such format.

Once generated, the electronic document may reside on the policy issuance architecture 116 for later viewing and/or retrieval, where the viewing and/or retrieval may be performed by the customer associated with the insurance policy or an insurance agent that has been granted access to the policy issuance architecture 116. The generated electronic document may be communicated to the customer using various means. For example, the generated electronic document may be communicated to the customer using an electronic form of communication, such as e-mail. In another instance, the customer may be sent a text message (e.g., via Short Message Service (SMS)) informing the customer that the generated electronic document is ready for viewing and/or retrieval. In a further instance, an insurance agent may print the electronic document, and then send a physical copy of the printed document to the customer. In this manner, the document generation module 216 facilitates the creation of electronic documents notifying the customer of an insurance policy that the insurance policy has been cancelled or that a cancellation request has been successfully processed.

As explained above, there may be instances where a cancellation request 224 has been successfully processed, but that the cancellation date for an identified insurance policy occurs at a time after the cancellation request 224 was made and/or processed. Accordingly, the policy evaluation module 212 is configured to process the cancellation requests 224 and to cancel one or more of the insurance policies stored in the insurance policies databases 218. In one embodiment, the policy evaluation module 212 is executed as a scheduled process (e.g., via a scheduler instantiated by the policy issuance architecture 116), and the policy evaluation module 212 queries the insurance policies databases 218 to return a listing of those insurance policies that are flagged for cancellation. For each returned insurance policy, the policy evaluation module 212 may then identify the corresponding cancellation request 224 associated with a returned insurance policy (e.g., by referencing an identifier in the insurance policy that links the insurance policy with its corresponding cancellation request 224). The policy evaluation module 212 may then compare a current date with a cancellation date stored in the cancellation request 224. Where the policy evaluation module 212 determines that the current date is the same as the cancellation date, the policy evaluation module 212 may then modify the insurance policy in the insurance policies databases 218 to reflect that the insurance policy has been cancelled (e.g., by changing a Status attribute of the insurance policy to a "Cancelled" status). Where the policy evaluation module 212 determines that the current date is prior to the cancellation date, the policy evaluation module 212 may take no action on the insurance policy.

As cancellation requests may vary for the insurance policies, the policy issuance architecture may execute the policy evaluation module 212 on a predetermined schedule. Accordingly, in one embodiment, the policy issuance architecture 116 may execute the policy evaluation module 212 once an hour, once a day, every other day, or at any other predetermined schedule. In this manner, the policy evaluation module 212 ensures that insurance policies that have been flagged for cancellation are actually cancelled according to the cancellation date associated with the insurance policy's corresponding cancellation request 224.

To facilitate the submission of the cancellation requests 224, the policy issuance architecture 116 may employ one or more graphical user interfaces, implemented as webpage(s) 238. FIGS. 3-7 illustrate the various graphical user interfaces that the policy issuance architecture 116 may implement.

Figure 3:
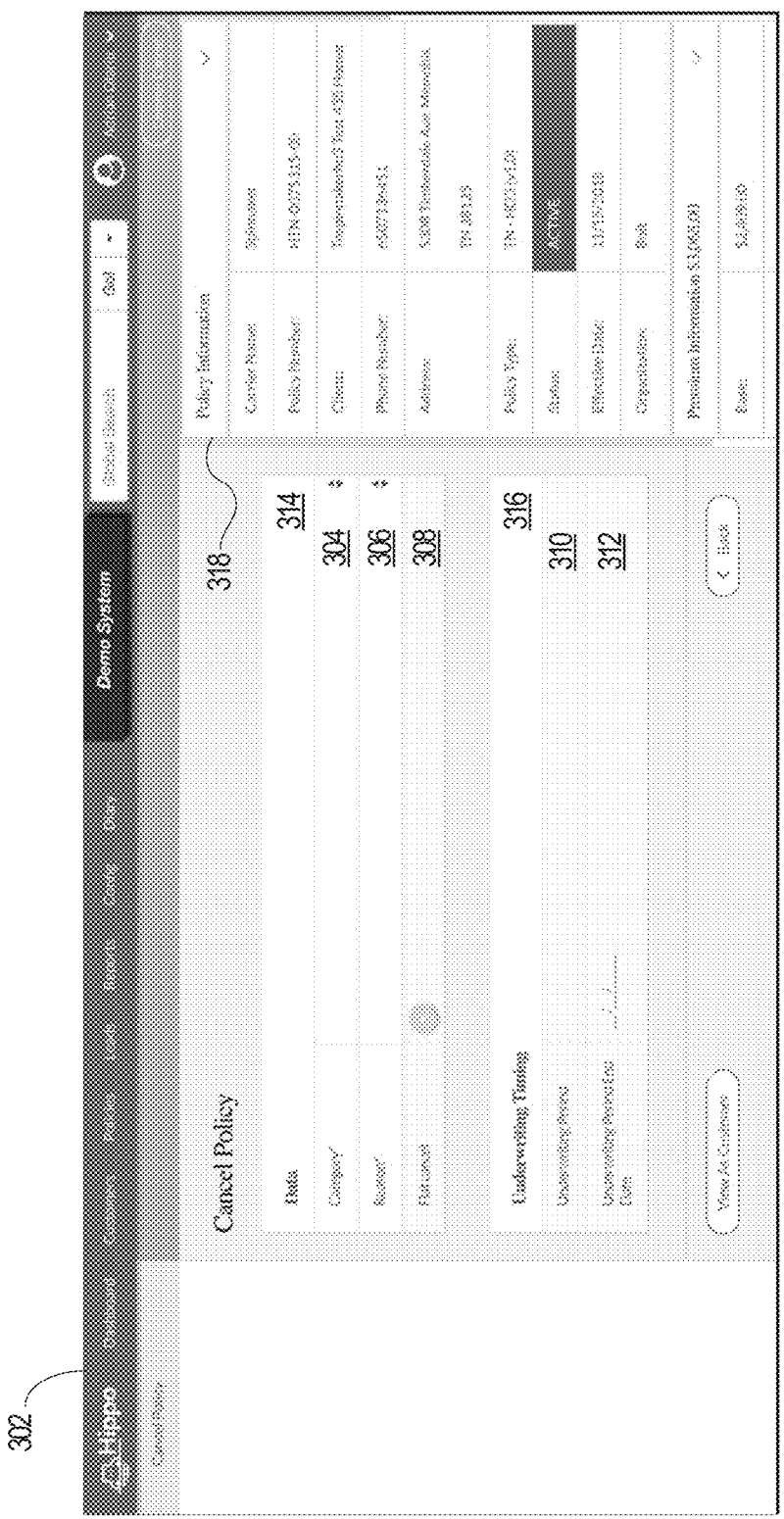
FIG. 3 illustrates a graphical user interface for interacting with the policy issuance architecture of FIG. 2, according to an example embodiment.

FIG. 3 illustrates a graphical user interface 302 for interacting with the policy issuance architecture 116 of FIG. 2, according to an example embodiment. The graphical user interface 302 includes a first panel 318 (or portion 318) that displays one or more insurance policy attributes and insurance policy attribute values for a particular insurance policy. As discussed above, the values for the various attributes shown in the first panel 318 may be obtained from one or more of the insurance policies databases 218. The graphical user interface 302 also includes a second panel 314 and a third panel 316, where a user interacting with the policy issuance architecture 116 may select various values for submitting a cancellation request 224.

The panels 314-316 may be instantiated according to one or more of the cancellation rules selected from the cancellation rules databases 220. As explained above, the cancellation rules may be defined by one or more JSON files, and the JSON files may include one or more JSON objects that provide the values for the input fields illustrated in FIG. 3. The input fields of the first panel 314 include a category field 304 for providing a first level category of the cancellation request 224, a reason field 306 for providing a reason for the cancellation of the insurance policy, and a flat cancel field 308 for providing a value that indicates whether the cancellation of the insurance policy is a flat cancel (e.g., a "yes" or "no" value or a "true" or "false" value). In one embodiment, the values for the category field 304 are obtained from a variable of each first level JSON object defined in a JSON file for a particular geographic location, such as the "name" variable of the "new_business" JSON object, the "name" variable of the "mid_term" JSON object, and so forth. Furthermore, the values of the reason field 306 are obtained from a variable of each third level JSON object associated with a particular second level JSON object based on the value selected in the category field 304. For example, where the "New-Business" value is selected for the category field 304, the underwriting cancellation module 214 may reference the second level JSON object named "reasons" to obtain the values of the "name" variable for each third level JSON object defined under the "reasons" JSON object. Accordingly, values of the reason field 306 may be obtained from the "name" variable of the "new_business_escrow_payment_never_received" JSON object, the "name" variable of the "new_business_insured_request_flat" JSON object, and the "name" variable of the "new_business_company_equst_flat" JSON object.

The input fields of the second panel 316 include input fields related to the timing of the cancellation request, and include an underwriting timing period field 310 and a date field 312 indicating the day that the underwriting period expires and the insurance policy can be cancelled. In one embodiment, the values of the input fields 310-312 are provided by the user interacting with the policy issuance architecture 116. In another embodiment, the underwriting cancellation module 214 populates the values of the input fields 310-312 with the values of corresponding variables associated with the values selected in one or more of the input fields 304-308. For example, and with reference to the JSON objects described above, where the "New Business" category is selected using the category input field 304, the underwriting cancellation module 214 may then populate the underwriting period field 310 with a value of "60," which corresponds to the value of the "underwriting_days" variable of the first level JSON object (e.g., the category JSON object). Using the value of "60," the underwriting cancellation module 214 may then compute a date for the date field 312 based on the current date at which the cancellation request is being submitted (e.g., 60 days from the current data). The underwriting cancellation module 214 may then populate the date field 312 with the value of the computed date.

Figure 4:
FIG. 4 illustrates a display of a first sub-panel for selecting various menu items using the graphical user interface of FIG. 3, according to an example embodiment.
Figure 5:
FIG. 5 illustrates a display of the first sub-panel 402 shown in FIG. 4 with a different set of values based on the value of the category field 304, according to an example embodiment.

When a user selects a category using the category field 304, the values of the reason field 304 are populated accordingly. Using a drop-down menu, or other input selection mechanism, a user may then select a reason for the cancellation request 224. FIG. 4 illustrates a display of a first sub-panel 402 for selecting various menu items using the graphical user interface of FIG. 3, according to an example embodiment. As shown in FIG. 4, the first sub-panel 402 includes values obtained from a second level JSON object, where the values are of the first sub-panel 402 are based on the category selected in the category field 304. However, these values are subject to change depending on category selected using the category field 304. FIG. 5 illustrates a display of the first sub-panel 402 shown in FIG. 4 with a different set of values based on the value of the category field 304, according to an example embodiment. As shown in FIG. 5, the first sub-panel 402 includes values that are based on the "Mid-Term" category (e.g., the "Mid-Term" JSON object), and the user may select one or more of the values for providing the reason for the cancellation request 224. Although the foregoing example does not list all of the values illustrated in FIG. 5, some of the values have been omitted for the sake of brevity and readability. Accordingly, one of ordinary skill in the art will appreciate that the "reasons" JSON object may be expanded and/or modified to include additional, or alternative, JSON objects that each correspond to a reason for the cancellation request 224. In this regard, a "reasons" JSON object may define one or more third level JSON objects as particular reasons for the cancellation request 224 where each third level JSON object includes a "name" variable whose value is displayable within the first sub-panel 402.

Figure 6:
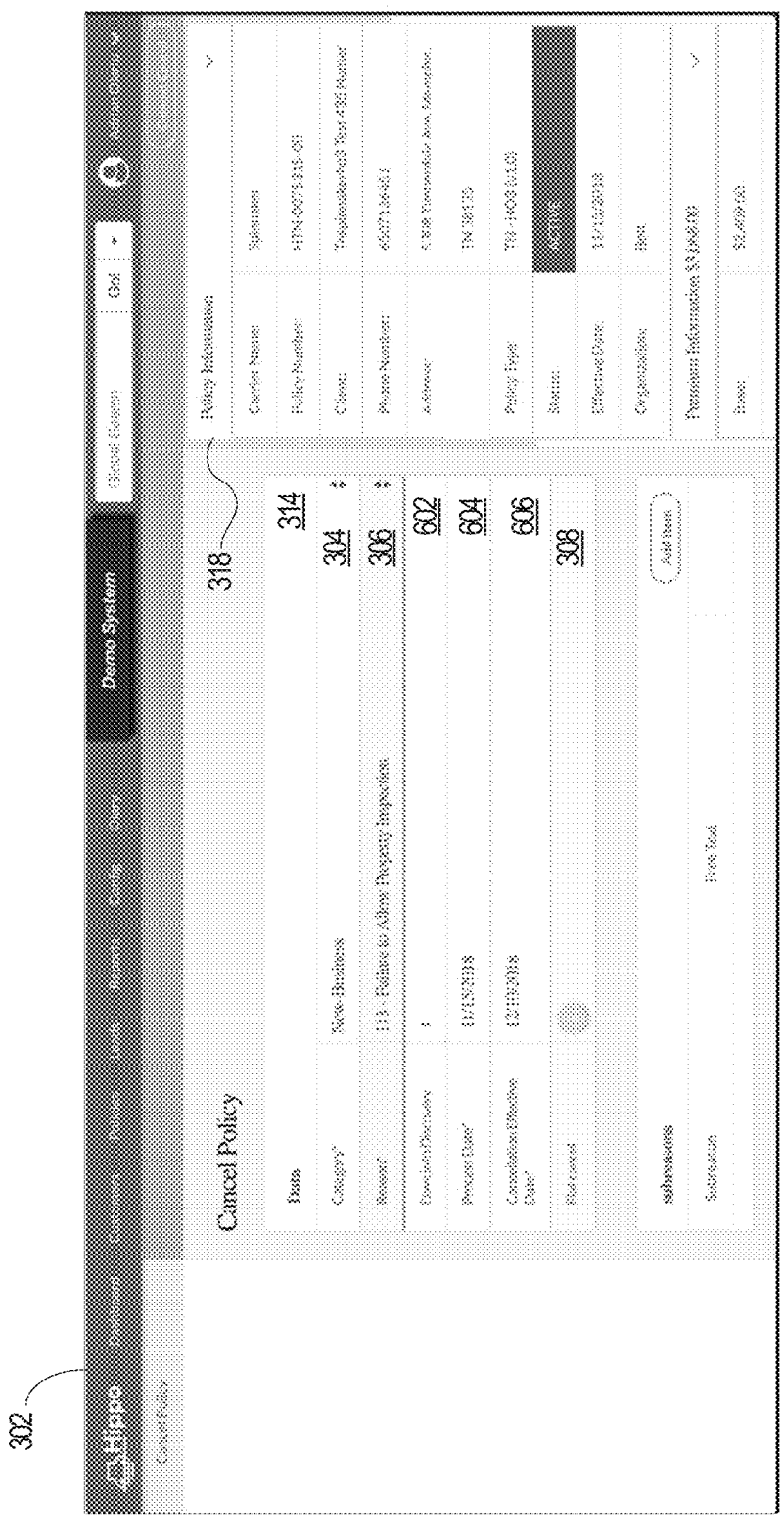
FIG. 6 illustrates another implementation of the graphical user interface shown in FIG. 3 with additional input fields relating to a cancellation request, according to an example embodiment.

FIG. 6 illustrates another implementation of the graphical user interface 302 shown in FIG. 3 with additional input fields for providing one or more values of a cancellation request, according to an example embodiment. In FIG. 6, the input fields include a discovery field 602, a process date field 604, and a cancellation effective date field 606. In one embodiment, the value of the discovery field 602 indicates the number of days that have passed since discovering an incident relating to the value of the reason field 306. In the example shown in FIG. 6, the value of the discovery field 602 indicates the number of days that have passed since there was a failure to allow a property inspection. The value of the discovery field 602 may be provided by the user (e.g., an insurance agent or other authorized user) that interacts with the policy issuance architecture 116.

The value of the process date field 604 indicates the date on which the policy issuance architecture 116 will process the cancellation request 224. In one embodiment, the value of the process date field 604 is manually entered by a user of the policy issuance architecture 116. In another embodiment, the value of the process date field 604 is populated automatically by referencing a variable of a JSON object corresponding to the selected value of the reason field 306. In yet a further embodiment, the process date field 604 indicates the current date on which the cancellation request 224 is being submitted.

The value of the cancellation effective date field 606 indicates the calendar date on which the cancellation for the identified insurance policy becomes effective. In one embodiment, the underwriting cancellation module 214 determines the value displayed in the cancellation effective date field 606 based on the value in the process date field 604 and a value of the "underwriting_days" variable of the first level JSON object. For example, the value of the "underwriting_days" variable may be added to the value of the process date field 604 to yield the date in the cancellation effective date field 606. Additionally, and/or alternatively, a user may manually provide the value of the cancellation effective date field 606.

Figure 7:
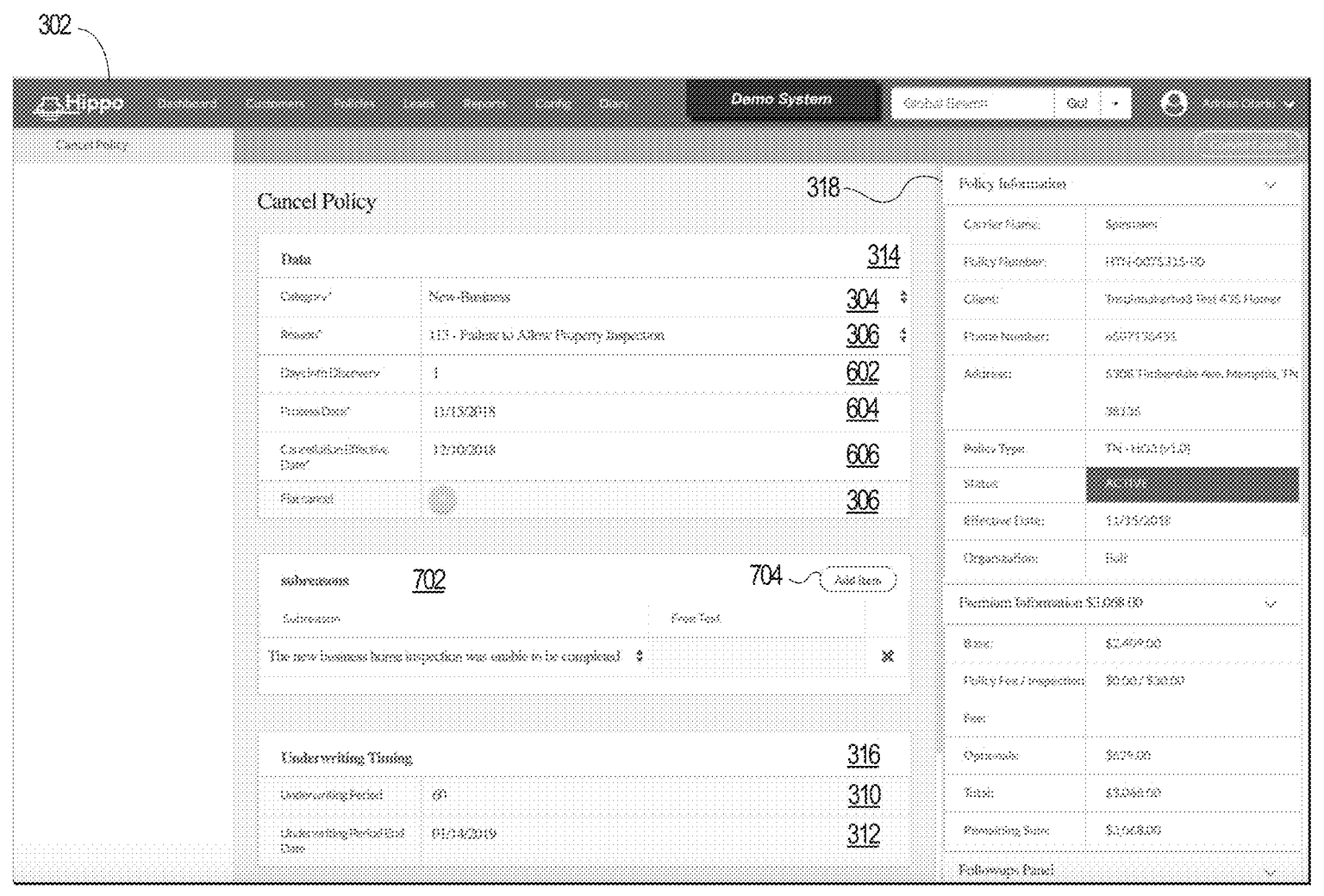

Referring now to FIG. 7 is the graphical user interface 302 of FIG. 3 with an additional sub-panel 702 for providing a sub-reason for the cancellation request 224 according to an example embodiment. In one embodiment, the sub-reason sub-panel 702 is displayed in response to a selection of a value (e.g., a menu item) from the reason field 306. As explained with reference to the JSON objects at the different levels, a third level JSON object (e.g., a specific "reason" JSON object) may have a "sub-reason" JSON object (e.g., a fourth level JSON object) that includes one or more additional reasons for explaining why a cancellation request 224 is being submitted for a particular insurance policy. The values for the sub-reason JSON object may be used to populate the values of a drop-menu or other control element that allows a user interacting with the policy issuance architecture 116 to provide one or more sub-reasons for why the cancellation request 224 is being submitted.

In one embodiment, the sub-panel 702 is not displayed when the graphical user interface 302 is initially displayed to a user interacting with the policy issuance architecture 116. This is because, in some instances, value selected in the reason field 306 may not be associated with one or more sub-reasons. Accordingly, displaying the sub-panel 702 prior to a selection of a value in the reason field 306 would decrease the amount of available space on the graphical user interface 302 for displaying other fields, sub-panels, items, or combinations thereof. Accordingly, the sub-panel 702 is then displayed when a value in the reason field 306 is selected that is associated with one or more sub-reasons. Furthermore, if the sub-panel 702 is currently displayed and another value from the reason field 306 is selected that is not associated with one or more sub-reasons, the sub-panel 702 may be hidden from view (e.g., not displayed). In one embodiment, the sub-panel 702 is "hidden" and/or "unhidden" using one or more commands of a computer programming and/or computer scripting language, such as JavaScript.

Where the sub-panel 702 is displayed, the sub-panel 702 may also include a control element 704, such as a graphical button, for adding one or more sub-reasons to the sub-panel 702. In one embodiment, when the control element 703 is selected, an additional field for entering a sub-reason is displayed via the sub-panel 702, and the values for the sub-reason field are obtained from the sub-reasons JSON object associated with the reason JSON object corresponding to the value selected in the reason field 306. Furthermore, depending on whether a sub-reason JSON object includes the "free_form_text" variable, a user may be able enter text into the added sub-reason field. For example, where the sub-reason JSON object includes the "free_form_text" variable with a value of "TRUE," the user can enter his or her own text into the sub-reason text field displayed in the sub-panel 702. Thus, in this manner, the sub-panel 702 allows a user to provide a sub-reason for the cancellation request 224.

Once the user has completed one or more fields displayed in the graphical user interface 302, the user may submit the cancellation request 224 to the policy issuance architecture 116. For example, the user may select a selectable element (not shown) displayed by the graphical user interface 302 to signal to the underwriting cancellation module 214 that the cancellation request 224 is ready for verification and/or submission. In one embodiment, the underwriting cancellation module 214 then verifies that the user has provided values for one or more of the fields shown in the graphical user interface 302. For example, where the user is required to provide a value for the category field 304, the reason field 306, and/or the flat cancel field 308, the underwriting cancellation module 214 verifies that the user has provided such values. Where the user does not provide such values, the underwriting cancellation module 214 may instruct the web service frontend 210 to display a prompt to the user requesting that the user provide such values. The prompt may include an error message or other message informing the user how to correct for the verification failure.

Where the user provides the requisite values for the various fields displayed in the graphical user interface 302, the underwriting cancellation module 214 may then verify that one or more dates are accurate and/or have been determined correctly. Accordingly, in one embodiment, the underwriting cancellation module 214 determines, and/or re-determines, one or more of the values appearing in one or more of the fields involving a computation, such as the cancellation effective date field 606, the date field 312, or any other such fields displayed in the graphical user interface 302. As explained above, the underwriting cancellation module 214 may perform these operations with reference to one or more of the JSON objects defined by the cancellation rules stored in the cancellation rules databases 220. In some instances, the underwriting cancellation module 214 may forego these verification operations, such as where an administrator or other authorized user instructs the underwriting cancellation module 214 to skip these steps.

Where the underwriting cancellation module 214 verifies that the various fields of the cancellation request are accurate and/or have been completed, the underwriting cancellation module 214 may store the values of the displayed fields as a cancellation request 224. In addition, an association may be established between the cancellation request 224 and the corresponding insurance policy for which the cancellation request 224 has been submitted. As discussed above with reference to FIG. 2, the policy evaluation module 212 may periodically determine an insurance policy is associated with a cancellation request 224.

FIGS. 8-11 illustrate method 802, in accordance with an example embodiment, for receiving and processing a cancellation request for an identified insurance policy. The method 802 is implemented by one or more components illustrated in FIG. 2 and is discussed by way of reference thereto.

Figure 8:
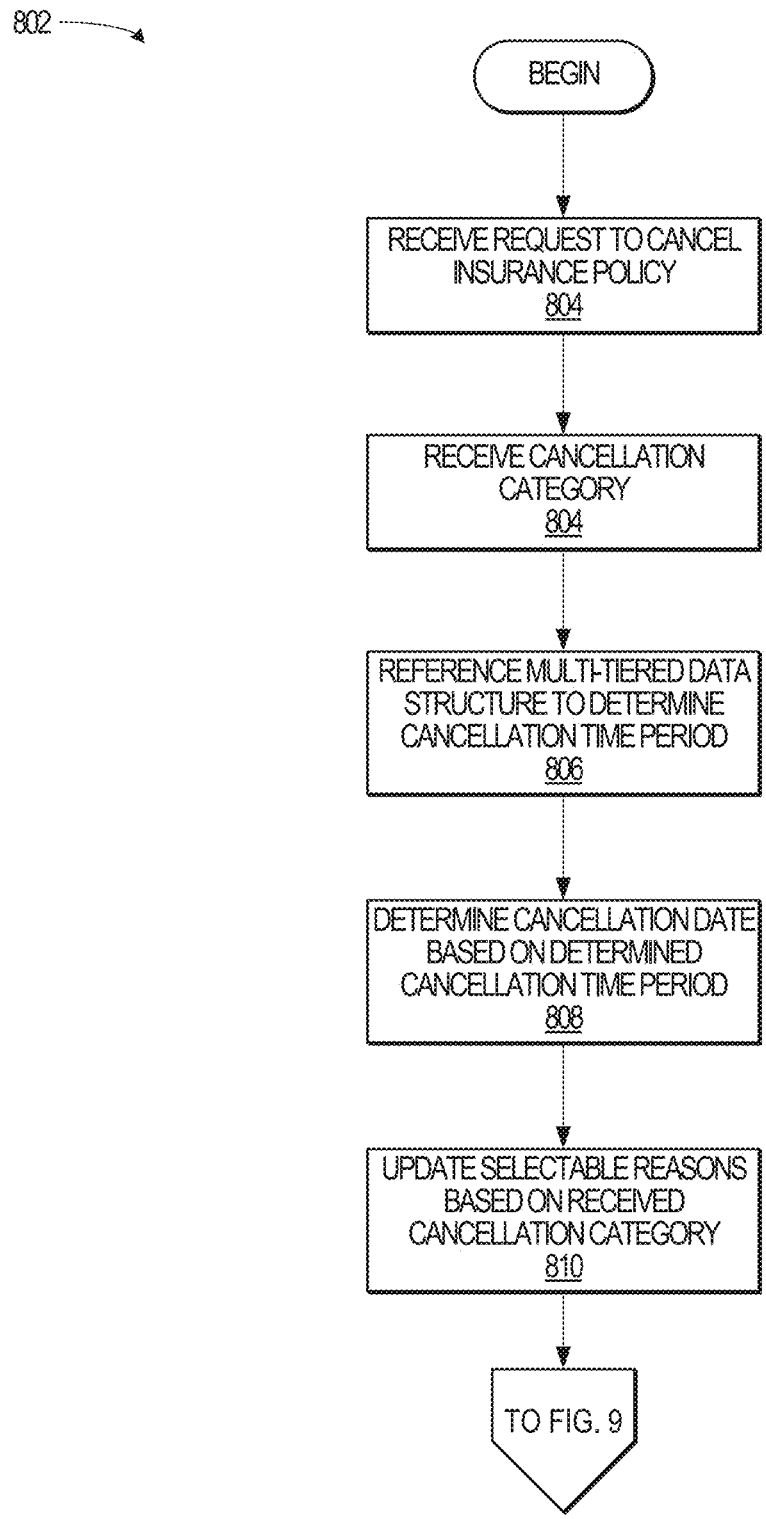
FIGS. 8-11 illustrate method, in accordance with an example embodiment, for receiving and processing a cancellation request for an identified insurance policy.

Initially, and with reference to FIG. 8, the policy issuance architecture 116, via the web service frontend 210, receives a request to cancel a particular insurance policy (Operation 804). Accordingly, the web service frontend 210 may invoke the underwriting cancellation module 214 to retrieve and/or implement one or more web page(s) 238 relating to the cancellation request. In some instances, one or more of the retrieved web page(s) 238 may include computer-executable code of the underwriting cancellation module 214, which may be communicated to one or more of the client devices 104-108 that requested the cancellation of the insurance policy.

In one embodiment, the web service frontend 210 and/or the underwriting cancellation module 214 also receives insurance identifying information for a particular insurance policy. As discussed above, the insurance identifying information may be used to retrieve various insurance details for the identified insurance policy from an insurance policies database 218, such as the California insurance policy database 226, the Illinois insurance policy database 228, or the Texas insurance policy database 230. Further still, the underwriting cancellation module 214 may also use the insurance identifying information to retrieve a corresponding set of cancellation rules from a cancellation rules database 220, including one or more multi-tiered data structures that define different values that may be displayed, and/or selected, via the one or more web page(s) 238.

Having retrieved a set of cancellation rules that include the multi-tiered data structurer discussed above, the underwriting cancellation module 214 determines the cancellation time period for the identified insurance policy (Operation 806). As explained above, one or more of the JSON objects may include a variable that defines the underwriting cancellation period (e.g., via the "underwriting_days" variable). Using the identified time period, the underwriting cancellation module 214 then determines a cancellation date for when the cancellation request for the identified insurance policy may go into effect (Operation 808). In some instances, the cancellation date may be the first, effective date that the identified insurance policy may be cancelled.

The underwriting cancellation module 214 then determines a cancellation date based on the determined time period from Operation 808 (Operation 806). In one embodiment, the determined cancellation date is displayed via one or more of the web page(s) 238. For example, as illustrated in FIGS. 6-7, the determined cancellation date may be displayed in a cancellation effective date field 606. Displaying the determined cancellation date in the cancellation effective data field 606 informs a user or other operating of the policy issuance architecture 116 when the cancellation for the identified insurance policy may first go into effect.

At Operation 810, the underwriting cancellation module 214 updates the selectable reasons relating to the cancellation request (Operation 810). In one embodiment, the underwriting cancellation module 214 references the multi-tiered data structure (e.g., provided in an example above) to obtain the values to populate into the reason field 306 of the graphical user interface 302 illustrated in FIG. 3.

Figure 9:
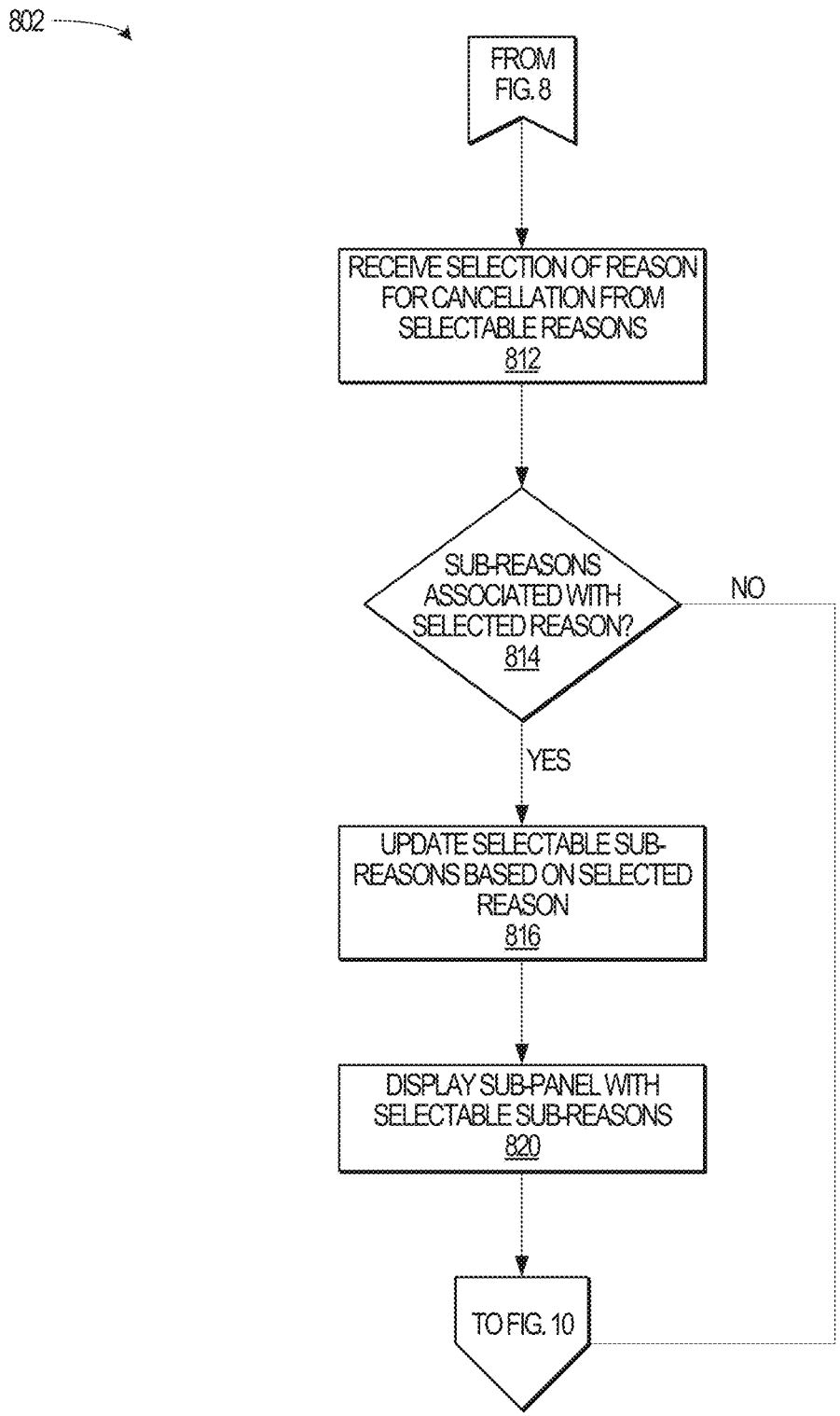

Referring next to FIG. 9, the underwriting cancellation module 214 receives a selection of a reason value selected from the values of the reason field 306 (Operation 812). The underwriting cancellation module 214 may then reference the multi-tiered data structure to determine whether there are one or more sub-reason values associated with the selected reason value (Operation 814). Where this determination is made in the affirmative (e.g., the "YES" branch of Operation 814), the method 802 proceeds to Operation 816. Alternatively, where this determination is made in the negative (e.g., the "NO" branch of Operation 814), the method 802 proceeds to Operation 828 of FIG. 10, which is discussed in more detail below.

At Operation 816, the underwriting cancellation module 214 updates the selectable sub-reason values based on the selected reason value (Operation 816). As discussed above, one or more reasons stored in the multi-tiered data structure may be associated with a corresponding set of sub-reasons for submitting the cancellation request. As shown in FIG. 7, the selection of a reason value may cause a display of the sub-panel 702, which allows an administrator or user interacting with the policy issuance architecture 116 to select one or more sub-reasons for the cancellation request. 224 (Operation 820).

Figure 10:
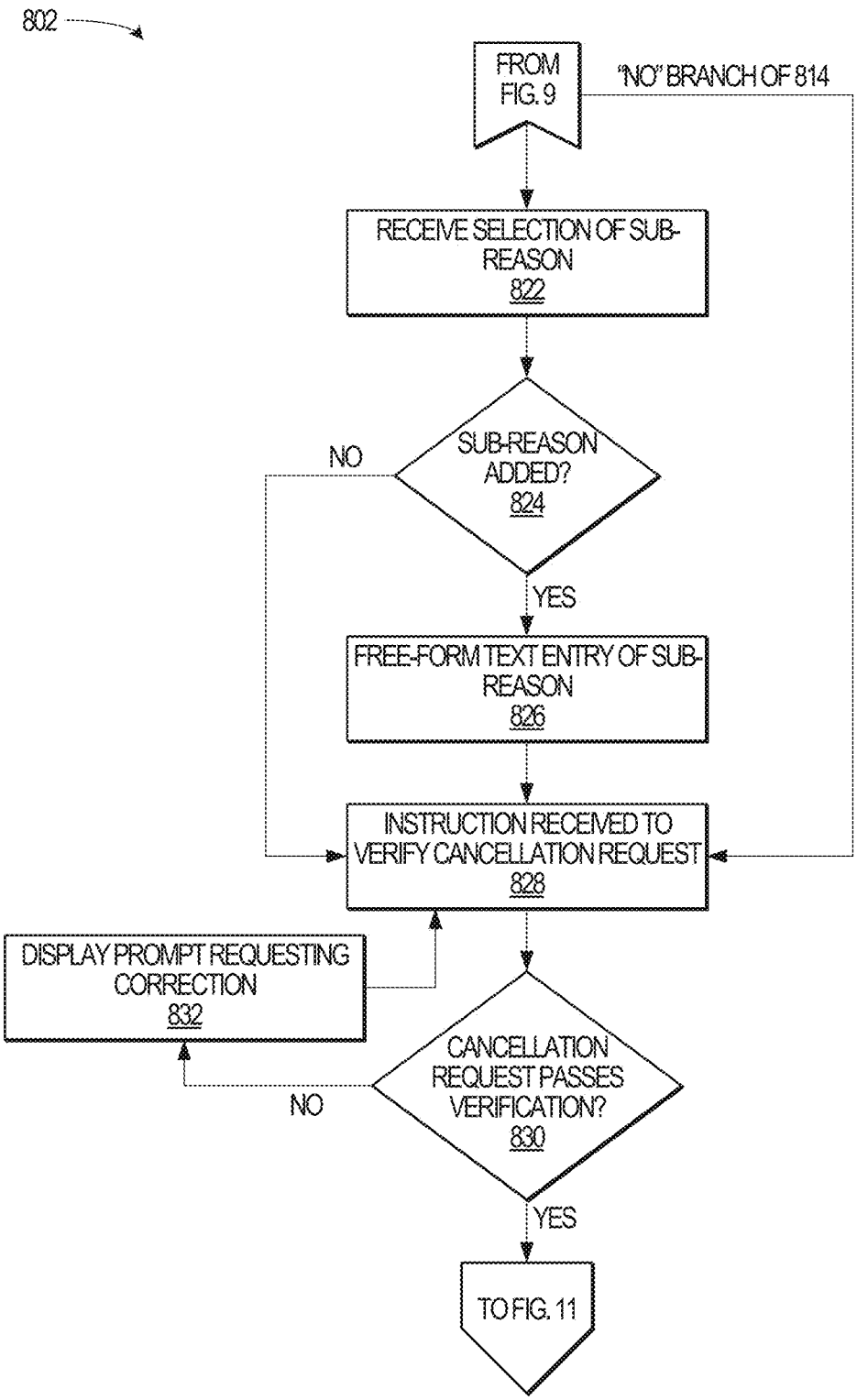

Referring next to FIG. 10, the underwriting cancellation module 214 receives a selection of a sub-reason value by a user or administrator interacting with the sub-panel 702 (Operation 822). Additionally and/or alternatively, the user or administrator may manually add a sub-reason to the cancellation request via the sub-panel 702 and, in particular, using the control element 704. However, as discussed above, not every reason that includes a sub-reason may allow for the user to manually add a sub-reason. As explained above, the multi-tiered data structure may include a variable, the "free_form_text" variable, that has a value that indicates whether a selected reason is enterable as a free-form text reason. Accordingly, at Operation 824, the underwriting cancellation module 214 determines whether the control element 704 has been selected for entry of a free-form sub-reason (Operation 824).

Where the underwriting cancellation module 214 determines that the control element 704 has been selected (e.g., the "YES" branch of Operation 824), the method 802 proceeds to Operation 826, where the user and/or administrator enters in a sub-reason for the cancellation request 224. The method then proceeds to Operation 828. Alternatively, the underwriting cancellation module 214 may not receive a free-form text entry of a sub-reason (e.g., the "NO" branch of Operation 824), in which case, the method 802 proceeds to Operation 828.

At Operation 828, the user and/or administrator interacting with the policy issuance architecture 116 submits the cancellation request 224 using a control element or other selectable element displayed via the graphical user interface 302 (Operation 828). Upon selection of the selectable element, the underwriting cancellation module 214 may then verify that the cancellation request 224 has been correctly and/or accurately completed (Operation 830). As explained above, in one embodiment, the underwriting cancellation module 214 verifies that the user has provided values for one or more of the fields shown in the graphical user interface 302. For example, where the user is required to provide a value for the category field 304, the reason field 306, and/or the flat cancel field 308, the underwriting cancellation module 214 verifies that the user has provided such values. Where the underwriting cancellation module 214 cannot verify the cancellation request 224 (e.g., the "NO" branch of Operation 830), the method 802 proceeds to Operation 832. At Operation 832, the underwriting cancellation module 214 identifies the failure in the verification (e.g., that one or more values are missing, improper, and/or incorrect), and a prompt or other message is displayed to the user requesting that the user correct for the error in the verification (Operation 832). The method may then proceed to Operation 828, where the user may re-submit the cancellation request 224.

Figure 11:
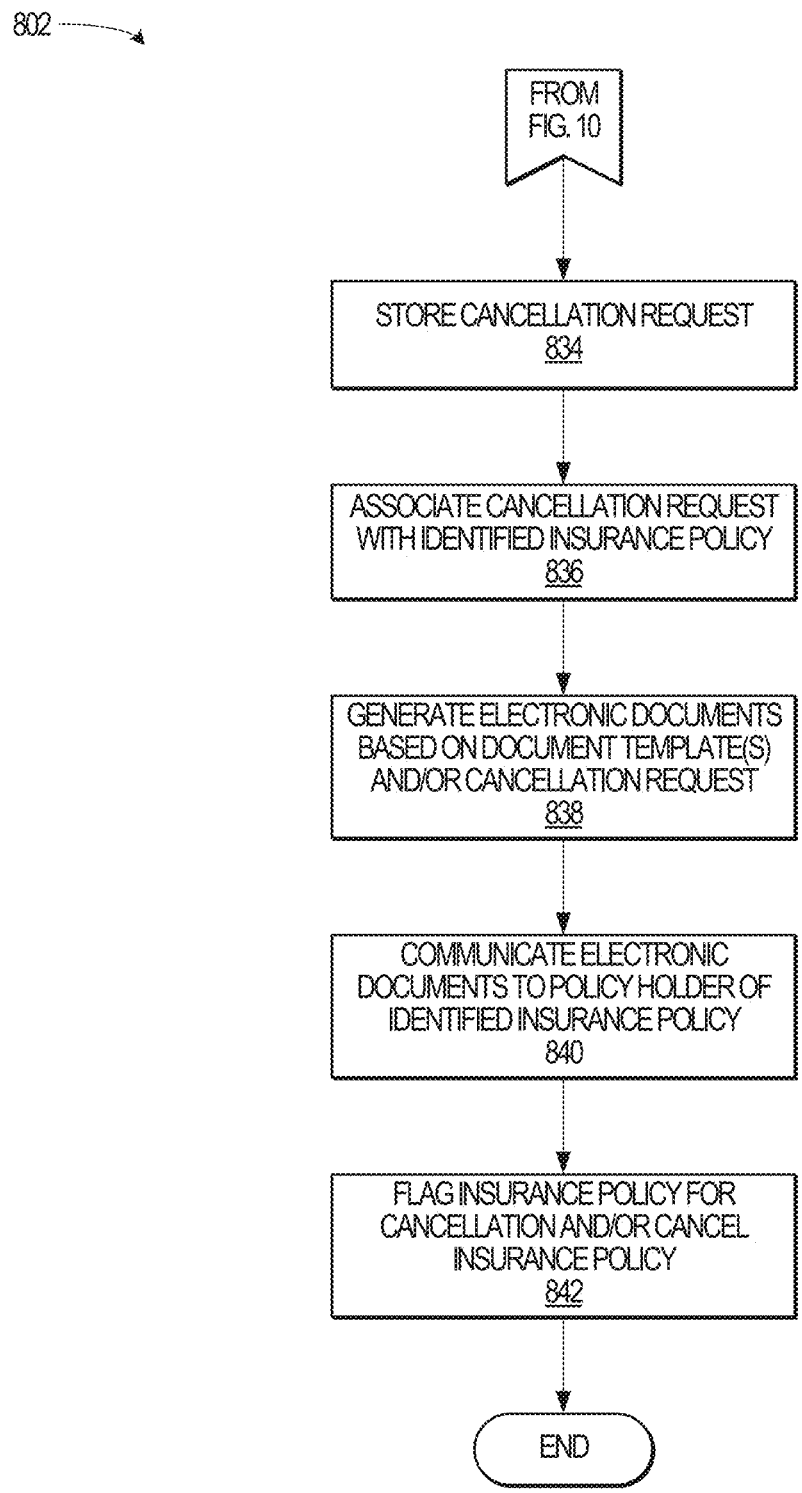

Alternatively, where the underwriting cancellation module 214 verifies that the cancellation request 214 is correct (e.g., the "YES" branch of Operation 830), the method 802 then proceeds to Operation 834 shown on FIG. 11. Referring to FIG. 11, the underwriting cancellation module 214 stores the cancellation request 224 (Operation 834). Furthermore, the underwriting cancellation module 214 then associates the cancellation request 224 with the identified insurance policy to which the cancellation request 224 should apply (Operation 836). As explained above, the cancellation request 224 may be associated with a unique identifier, and the unique identifier may be used to associate the cancellation request 224 with the identified insurance policy.

After storing the cancellation request 224, policy issuance architecture 116 may then invoke the document generation module 216 to generate one or more electronic document(s) (Operation 838). As explained previously, the policy issuance architecture 116 may leverage one or more document template(s) 222 to generate the various electronic document(s). Once the electronic document(s) are generated, the electronic document(s) may then be communicated to a policyholder associated with the identified insurance policy (Operation 840). Sending the electronic document(s) to the policyholder associated with the identified insurance policy ensures that the policyholder is made aware of the near-term cancellation of the identified insurance policy. The policy issuance architecture 116 may then add a "flag" or other value to the identified insurance policy to indicate that the identified insurance policy is to be cancelled (Operation 842).

Figure 12:
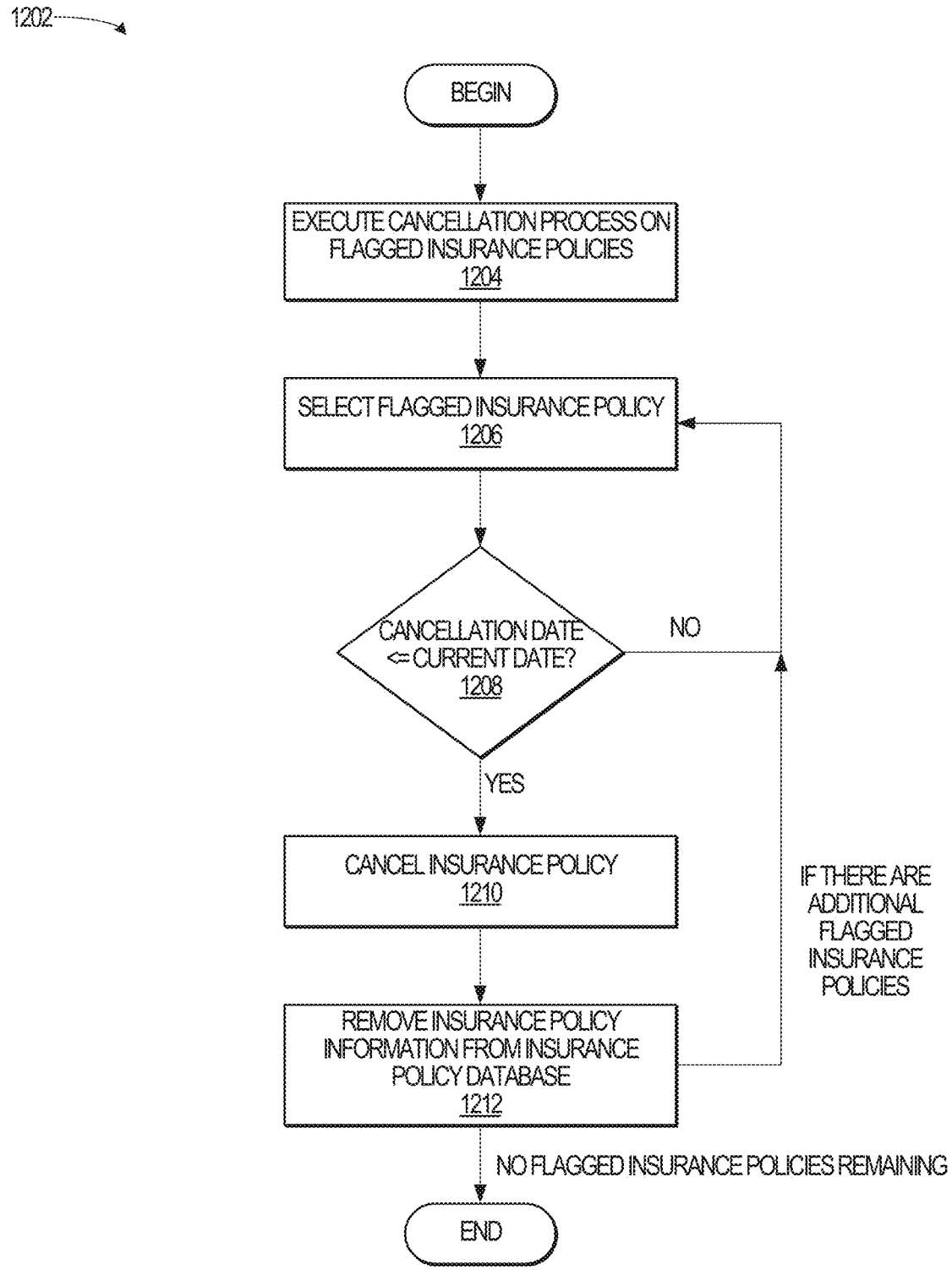
FIG. 12 illustrates a method, in accordance with an example embodiment, for executing a process to determine whether one or more insurance policies are scheduled for cancellation.

FIG. 12 illustrates a method 1202, in accordance with an example embodiment, for executing a process to determine whether one or more insurance policies are scheduled for cancellation. The method 1202 may be implemented by one or more of the components illustrated in FIG. 2 and is discussed by way of reference thereto.

Initially, the policy issuance architecture 116 executes or invokes the policy evaluation module 212 to determine whether one or more flagged insurance policies are to be cancelled (Operation 1204). As discussed previously, in one embodiment, the policy evaluation module 212 is executed as a scheduled process (e.g., via a scheduler instantiated by the policy issuance architecture 116), and the policy evaluation module 212 queries the insurance policies databases 218 to return a listing of those insurance policies that are flagged for cancellation.

To determine whether an insurance policy is to be cancelled, the policy evaluation module 212 initially selects a first insurance policy having the set flag (Operation 1206). The policy evaluation module 212 then references the cancellation request (or one or more values that define the cancellation request) associated with the selected insurance policy. In particular, the policy evaluation module 212 references the cancellation date value (e.g., the value from the cancellation effective date field 606) and compares the cancellation date value with the current date value (Operation 1208). Where the current date value is equal to or has passed the cancellation date value (e.g., the "YES" branch of Operation 1208), the method 1202 proceeds to Operation 1210, where the selected insurance policy is cancelled and marked as cancelled (Operation 1210). In some instances, the current date value may be greater than the cancellation date value as the policy issuance architecture 116 may not execute the policy evaluation module 212 every date, but at various intervals (e.g., every other day, every two days, etc.).

Where the current date value is less than the cancellation date value (e.g., the "NO" branch of Operation 1208), the method 1202 returns to Operation 1206 where the policy evaluation module 212 selects the next flagged insurance policy to evaluate.

At Operation 1210, the policy evaluation module 212 cancels the selected insurance policy. In one embodiment, the policy evaluation module 212 cancels the selected insurance policy by changing a Status attribute of the insurance policy to a "Cancelled" status value. Additionally and/or alternatively, the policy evaluation module 212 removes the insurance policy from one or more of the insurance policy databases 218 (Operation 1212). Removing the insurance policy from one or more of the insurance policy databases 218 may include, but is not limited to, erasing the information associated with the insurance policy, identifying the insurance policy as inactive, overwriting the insurance policy information with NULL or non-zero data, or any other means of removing the insurance policy information from the insurance policy databases 218. The method 1202 then returns to Operation 1206 if there are remaining insurance policies to evaluate that are flagged. Alternatively, if there are no remaining insurance policies that are flagged, the method 1202 may terminate.

In this manner, the disclosed systems and methods provide for an automatic underwriting cancellation implementation that leverages a multi-tiered data structure for rapidly and effectively identifying multiple insurance policies for removal. By using the multi-tiered data structure, the disclosed policy issuance architecture 116 can process a cancellation request for an insurance policy regardless of the state (e.g., the geographic location) of where the insured property or person resides. Because the multi-tiered data structure can be tailored to the rules specific to each state, the policy issuance architecture 116 can determine the appropriate timing for the cancellation of an insurance policy according to the rules applicable to the state where the insured property or person resides. Furthermore, because the policy issuance architecture 116 employs a scheduled processing approach to the cancellation of identified insurance policies, an insurance policy can be designated for cancellation much earlier than when the cancellation is supposed to occur. This provides peace of mind to the insurance agent or provider in knowing that a human agent or administrator does not have to specifically cancel an insurance policy. Furthermore, because the policy issuance architecture 116 is configured with the state-specific timings of the cancellations, this configuration reduces the possibility of human error and the likelihood that an insurance policy will be cancelled prematurely or later than when the cancellation was supposed to take effect.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-12 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 13:
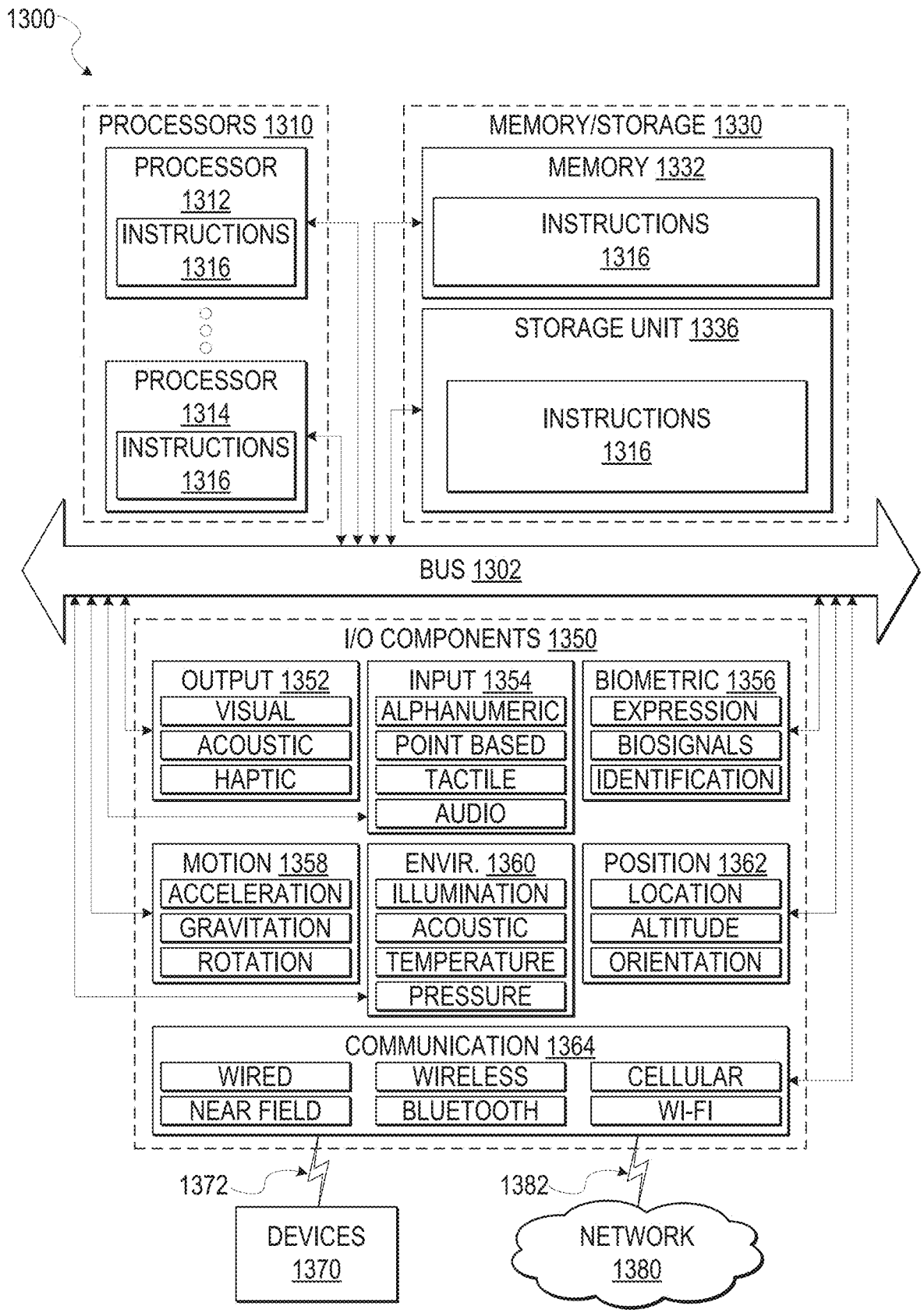
FIG. 13 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 13 is a block diagram illustrating components of a machine 1300, according to some example embodiments, able to read instructions from a machine-readable medium (e.g., a machine-readable storage medium or machine-readable storage device) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the flow diagrams of FIGS. 8-12. Additionally, or alternatively, the instructions 1316 may implement one or more of the components of FIGS. 1-2. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a PDA, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 1312 and processor 1314 that may execute the instructions 1316. The term "processor" is intended to include multi-core processor that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein. "machine-readable medium" includes a machine-readable storage device able to store instructions 1316 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372, respectively. For example, the communication components 1364 may include a network interface component or other suitable device to interface with the network 1380. In further examples, communication components 1364 may include wired communication components, wireless communication components, cellular communication components, Near Field Communication (NFC) components. Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1×RTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. An insurance claims processing system that automatically cancels an insurance policy, the system comprising:
   a non-transitory, computer-readable storage device having computer-executable instructions stored thereon;
   a web based interface that receives a cancellation request to cancel an identified insurance policy;
   a database comprising a multi-tiered data structure that includes a first level representing categories of cancellations to which the cancellation request can belong, each category at the first level within the multi-tiered data structure corresponding to an identifier that identifies a particular object or entry within the database, a value of the identifier corresponding to a category data structure object that defines the category represented by the identifier, a second level including a reason object nested within the category data structure object, the reason object representing reasons for cancellation in the category represented by the category data structure object in which the reason object is nested; and
   a processor that, having executed the computer-executable instructions, configures a system to perform a plurality of operations comprising:
      referencing the multi-tiered data structure of the database based on geographic information obtained from the identified insurance policy to evaluate one or more reasons for canceling the identified insurance policy;
      populating a first selectable field with a corresponding first plurality of values obtained from the first level of the multi-tiered data structure;
      displaying a graphical user interface comprising the first selectable field;
      receiving a first selection of a first value from the first selectable field via the graphical user interface;
      populating a first plurality of selectable fields with a corresponding second plurality of values obtained from the second level of the multi-tiered data structure, where in the second plurality of values are associated with the selected first value;
      receiving a second selection of a second value from the second plurality of values via the graphical user interface;
      verifying the cancellation request based on the selected first value and the selected second value;
      associating the verified cancellation request with the identified insurance policy; and
      at least one of flagging the identified insurance policy for cancellation or automatically cancelling the identified insurance policy.

2. The system of claim 1 wherein the plurality of operations further comprises:
   displaying an error message requesting that a user provide corrected information for the cancellation request based on the verification of the cancellation request.

3. The system of claim 1, wherein the plurality of operations further comprises:
   associating a plurality of cancellation dates with a plurality of insurance policies, wherein the plurality of cancellation dates are based on corresponding cancellation requests;
   automatically comparing, at a predetermined time interval, each cancellation date with a current date to determine whether the corresponding insurance policy is to be cancelled; and
   cancelling the corresponding insurance policy based on the automatic comparison.

4. The system of claim 1, wherein the category data structure objects and reason objects of the multi-tiered data structure are implemented as JavaScript Object Notation files.

5. The system of claim 1, wherein the plurality of operations further comprises:
   selecting the multi-tiered data structure from a plurality of multi-tiered data structures, wherein each multi-tiered data structure is associated with a particular geographic region.

6. The system of claim 1, wherein:
   the first level of the of the multi-tiered data structure comprises a plurality of category data structure objects, wherein each category data structure object corresponds to a category for explaining a reason for the cancellation request;
   each category data structure object comprises a reason object that includes values selected from the second plurality of values; and
   the populating of the first plurality of selectable fields with the corresponding second plurality of values is further based on the values selected from the reason object.

7. The system of claim 6, wherein the plurality of operations further comprises:
   modifying the graphical user interface to display a sub-reason panel based on the second selection of the second value, wherein the sub-reason panel comprises a control element for adding a sub-reason to the cancellation request;
   receiving a selection of the control element;
   determining whether the sub-reason panel is to include a third plurality of selectable values, wherein the third plurality of selectable values are based on the second selection of the second value;
   receiving a third selection of a third value selected from the third plurality of selectable values via the sub-reason panel; and
   storing the third value in a sub-reason object in a third level of the database, each sub-reason object representing a particular reason of the reasons for requesting the cancellation of the identified insurance policy, each reason object including one or more of the sub-reason objects, each sub-reason object including one or more variables that define the particular reason for requesting the cancellation represented by the sub-reason object.

8. A method for automatically cancelling an insurance policy, the method comprising:
   receiving a cancellation request to cancel an identified insurance policy;
   referencing a database comprising a multi-tiered data structure based on geographic information obtained from the identified insurance policy to evaluate one or more reasons for canceling the identified insurance policy, the multi-tiered data structure including a first level representing categories of cancellations to which the cancellation request can belong, each category at the first level within the multi-tiered data structure corresponding to an identifier that identifies a particular object or entry within the database, a value of the identifier corresponding to a category data structure object that defines the category represented by the identifier, a second level including a reason object nested within the category data structure object, the reason object representing reasons for cancellation in the category represented by the category data structure object in which the reason object is nested;

populating a first selectable field with a corresponding first plurality of values obtained from the first level of the multi-tiered data structure;

displaying a graphical user interface comprising the first selectable field;

receiving a first selection of a first value from the first selectable field via the graphical user interface;

populating a first plurality of selectable fields with a corresponding second plurality of values obtained from the second level of the multi-tiered data structure, where in the second plurality of values are associated with the selected first value;

receiving a second selection of a second value from the second plurality of values via the graphical user interface;

verifying the cancellation request based on the selected first value and the selected second value;

associating the verified cancellation request with the identified insurance policy; and at least one of flagging the identified insurance policy for cancellation or automatically cancelling the identified insurance policy.

9. The method of claim 8, further comprising:
displaying an error message requesting that a user provide corrected information for the cancellation request based on the verification of the cancellation request.

10. The method of claim 8, further comprising:
associating a plurality of cancellation dates with a plurality of insurance policies, wherein the plurality of cancellation dates are based on corresponding cancellation requests;

automatically comparing, at a predetermined time interval, each cancellation date with a current date to determine whether the corresponding insurance policy is to be cancelled; and cancelling the corresponding insurance policy based on the automatic comparison.

11. The method of claim 8, wherein the category data structure objects and reason objects of the multi-tiered data structure are implemented as JavaScript Object Notation files.

12. The method of claim 8, further comprising:
selecting the multi-tiered data structure from a plurality of multi-tiered data structures, wherein each multi-tiered data structure is associated with a particular geographic region.

13. The method of claim 8, wherein:
the first level of the of the multi-tiered data structure comprises a plurality of category data structure objects, wherein each category data structure object corresponds to a category for explaining a reason for the cancellation request;

each category data structure object comprises a reason object that includes values selected from the second plurality of values; and the populating of the first plurality of selectable fields with the corresponding second plurality of values is further based on the values selected from the reason object.

14. The method of claim 13, further comprising:
modifying the graphical user interface to display a sub-reason panel based on the second selection of the second value, wherein the sub-reason panel comprises a control element for adding a sub-reason to the cancellation request;

receiving a selection of the control element;

determining whether the sub-reason panel is to include a third plurality of selectable values, wherein the third plurality of selectable values are based on the second selection of the second value;

receiving a third selection of a third value selected from the third plurality of selectable values via the sub-reason panel; and storing the third value in a sub-reason object in a third level of the database, each sub-reason object representing a particular reason of the reasons for requesting the cancellation of the identified insurance policy, each reason object including one or more of the sub-reason objects, each sub-reason object including one or more variables that define the particular reason for requesting the cancellation represented by the sub-reason object.

15. A non-transitory, computer-readable storage device having computer-executable instructions stored thereon that, when executed by a processor, cause a system to perform a plurality of operations to cancel an insurance policy, comprising:

receiving a cancellation request to cancel an identified insurance policy;

referencing a database comprising a multi-tiered data structure based on geographic information obtained from the identified insurance policy to evaluate one or more reasons for canceling the identified insurance policy, the multi-tiered data structure including a first level representing categories of cancellations to which the cancellation request can belong, each category at the first level within the multi-tiered data structure corresponding to an identifier that identifies a particular object or entry within the database, a value of the identifier corresponding to a category data structure object that defines the category represented by the identifier, a second level including a reason object nested within the category data structure object, the reason object representing reasons for cancellation in the category represented by the category data structure object in which the reason object is nested;

populating a first selectable field with a corresponding first plurality of values obtained from the first level of the multi-tiered data structure;

displaying a graphical user interface comprising the first selectable field;

receiving a first selection of a first value from the first selectable field via the graphical user interface;

populating a first plurality of selectable fields with a corresponding second plurality of values obtained from the second level of the multi-tiered data structure, where in the second plurality of values are associated with the selected first value;

receiving a second selection of a second value from the second plurality of values via the graphical user interface;

verifying the cancellation request based on the selected first value and the selected second value;

associating the verified cancellation request with the identified insurance policy; and at least one of flagging the identified insurance policy for cancellation or automatically cancelling the identified insurance policy.

16. The non-transitory, computer-readable storage device of claim 15, wherein the plurality of operations further comprises:

displaying an error message requesting that a user provide corrected information for the cancellation request based on the verification of the cancellation request.

17. The non-transitory, computer-readable storage device of claim 15, wherein the plurality of operations further comprises:

associating a plurality of cancellation dates with a plurality of insurance policies, wherein the plurality of cancellation dates are based on corresponding cancellation requests;

automatically comparing, at a predetermined time interval, each cancellation date with a current date to determine whether the corresponding insurance policy is to be cancelled; and cancelling the corresponding insurance policy based on the automatic comparison.

18. The non-transitory, computer-readable storage device of claim 15, wherein the category data structure objects and reason objects of the multi-tiered data structure are implemented as JavaScript Object Notation files.

19. The non-transitory, computer-readable storage device of claim 15, wherein the plurality of operations further comprises:

selecting the multi-tiered data structure from a plurality of multi-tiered data structures, wherein each multi-tiered data structure is associated with a particular geographic region.

20. The non-transitory, computer-readable storage device of claim 19, wherein:

the first level of the of the multi-tiered data structure comprises a plurality of category data structure objects, wherein each category data structure object corresponds to a category for explaining a reason for the cancellation request;

each category data structure object comprises a reason object that includes values selected from the second plurality of values; and the populating of the first plurality of selectable fields with the corresponding second plurality of values is further based on the values selected from the reason object.

* * * * *

UNITED STATES PATENT AND TRADEMARK OFFICE
CERTIFICATE OF CORRECTION

PATENT NO. : 10,943,305 B2  
APPLICATION NO. : 16/450626  
DATED : March 9, 2021  
INVENTOR(S) : Olariu et al.

Page 1 of 1

It is certified that error appears in the above-identified patent and that said Letters Patent is hereby corrected as shown below:

On the Title Page

Item (71), in "Applicant", in Column 1, Line 1, delete "Hippo Analytics Inc.," and insert --Hippo Analytics Inc. dba Hippo Insurance Services,-- therefor Item (73), in "Assignee", in Column 1, Line 1, delete "Hippo Analytics Inc.," and insert --Hippo Analytics Inc. dba Hippo Insurance Services,-- therefor In the Claims In Column 32, Line 24, in Claim 6, delete "of the of the" and insert --of the-- therefor In Column 33, Line 60, in Claim 13, delete "of the of the" and insert --of the-- therefor In Column 36, Line 12, in Claim 20, delete "of the of the" and insert --of the-- therefor Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*